(12) United States Patent
Tsujikado et al.

(10) Patent No.: US 8,135,010 B2
(45) Date of Patent: Mar. 13, 2012

(54) SYSTEM AND APPARATUS THEREOF FOR ETHERNET PON COMMUNICATION

(75) Inventors: Ikutaro Tsujikado, Osaka (JP); Masataka Yamada, Osaka (JP); Toshihiko Inoue, Osaka (JP); Hiroomi Shinha, Osaka (JP); Hajime Fukushima, Kawasaki (JP); Tetsumi Ichikawa, Osaka (JP); Shiro Mori, Kawasaki (JP); Osamu Sekihata, Kawasaki (JP); Susumu Tominaga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1508 days.

(21) Appl. No.: 11/089,136

(22) Filed: Mar. 24, 2005

(65) Prior Publication Data

US 2005/0220104 A1 Oct. 6, 2005

Related U.S. Application Data

(63) Continuation of application No. PCT/JP03/04116, filed on Mar. 31, 2003.

(51) Int. Cl.
H04L 12/56 (2006.01)
(52) U.S. Cl. ........ 370/390; 370/401; 370/432; 709/220; 709/238
(58) Field of Classification Search ............. None
See application file for complete search history.

(56) References Cited

U.S. PATENT DOCUMENTS

| | | | | |
|---|---|---|---|---|
| 5,999,530 A | * | 12/1999 | LeMaire et al. | 370/390 |
| 6,101,180 A | * | 8/2000 | Donahue et al. | 370/352 |
| 6,181,681 B1 | * | 1/2001 | Hiscock et al. | 370/279 |
| 6,317,434 B1 | * | 11/2001 | Deng | 370/432 |
| 6,370,142 B1 | * | 4/2002 | Pitcher et al. | 370/390 |
| 6,967,932 B2 | * | 11/2005 | Jensen | 370/255 |
| 6,977,891 B1 | * | 12/2005 | Ranjan et al. | 370/229 |
| 7,307,945 B2 | * | 12/2007 | Gerdisch et al. | 370/217 |
| 2002/0085506 A1 | * | 7/2002 | Hundscheidt et al. | 370/254 |
| 2002/0146026 A1 | * | 10/2002 | Unitt et al. | 370/428 |

(Continued)

FOREIGN PATENT DOCUMENTS

JP 2000-004251 1/2000

(Continued)

OTHER PUBLICATIONS

"GeoStream A500 Series—Advanced IP Network Solution, Fujitsu Ethernet Passive Optical Network System," available from http://telecom.fujitsu.com/jp/, Sep. 2002.

*Primary Examiner* — Brian Roberts
(74) *Attorney, Agent, or Firm* — Staas & Halsey LLP

(57) ABSTRACT

A communication system includes a station-side terminal apparatus and multiple subscriber-side terminal apparatuses connected to the station-side terminal apparatus. The station-side terminal apparatus is configured to, in response to receipt of a packet from a subscriber-side terminal apparatus, a packet indicating whether data distribution is required, identify the subscriber-side terminal apparatus that has transmitted the packet, and transmit a packet indicating an address for which whether the transfer of distribution data is required is designated to the subscriber-side terminal apparatus based on whether data distribution is required. Each subscriber-side terminal apparatus is configured to, in response to receipt of a distribution packet, if the distribution packet has the address for which whether the transfer of distribution data is required is designated, transfer the distribution packet to host apparatuses accommodated thereto or prohibit the distribution packet from being transferred to the host apparatuses accommodated thereto.

2 Claims, 28 Drawing Sheets

U.S. PATENT DOCUMENTS

| | | | |
|---|---|---|---|
| 2002/0186694 A1* | 12/2002 | Mahajan et al. | 370/390 |
| 2003/0084191 A1* | 5/2003 | Yamamoto | 709/249 |
| 2003/0123453 A1* | 7/2003 | Ooghe et al. | 370/395.53 |
| 2004/0100970 A1* | 5/2004 | Gerdisch et al. | 370/395.53 |
| 2005/0111474 A1* | 5/2005 | Kobayashi | 370/432 |

FOREIGN PATENT DOCUMENTS

| | | |
|---|---|---|
| JP | 2000-349818 | 12/2000 |
| JP | 2002-217973 | 8/2002 |

* cited by examiner

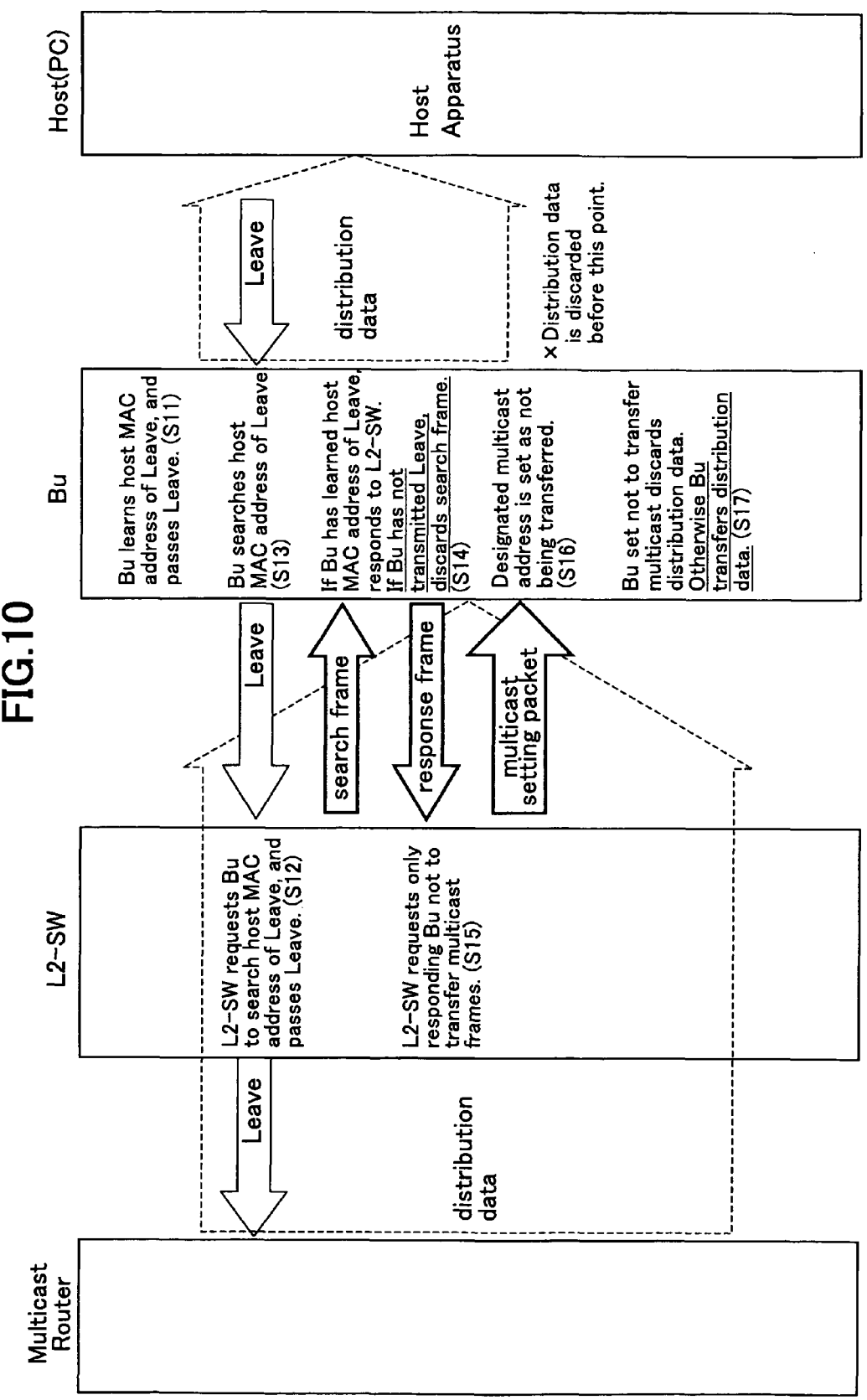

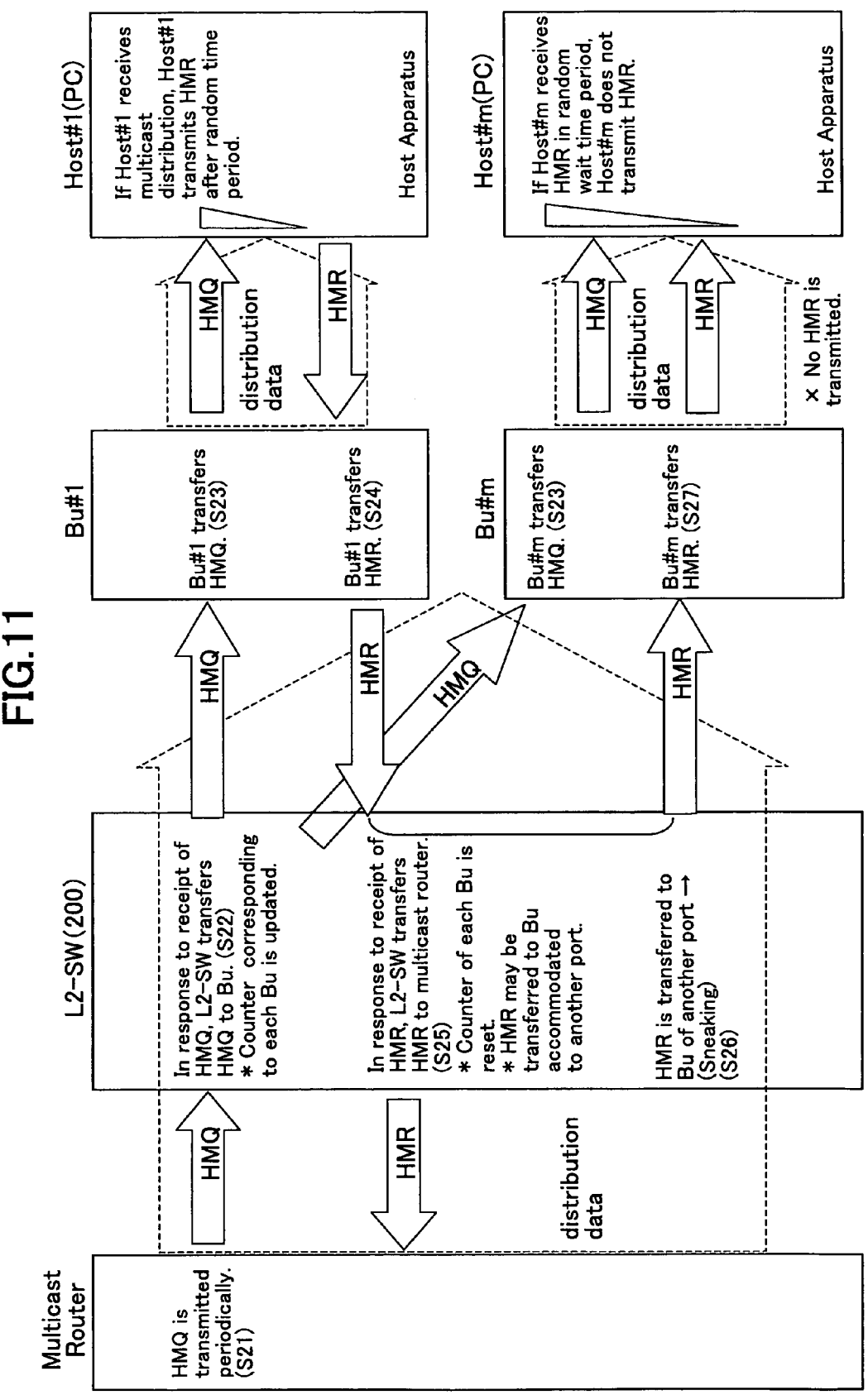

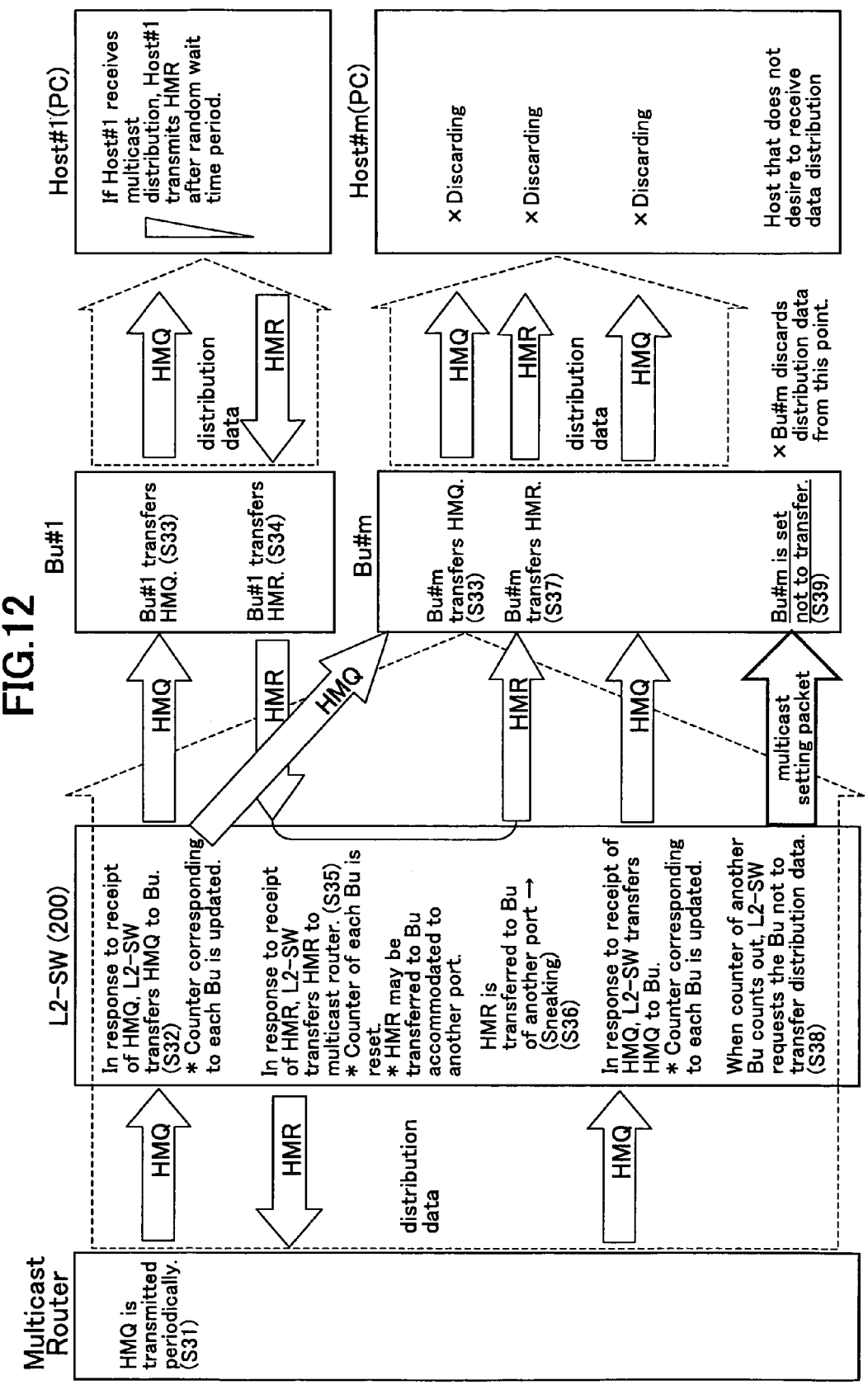

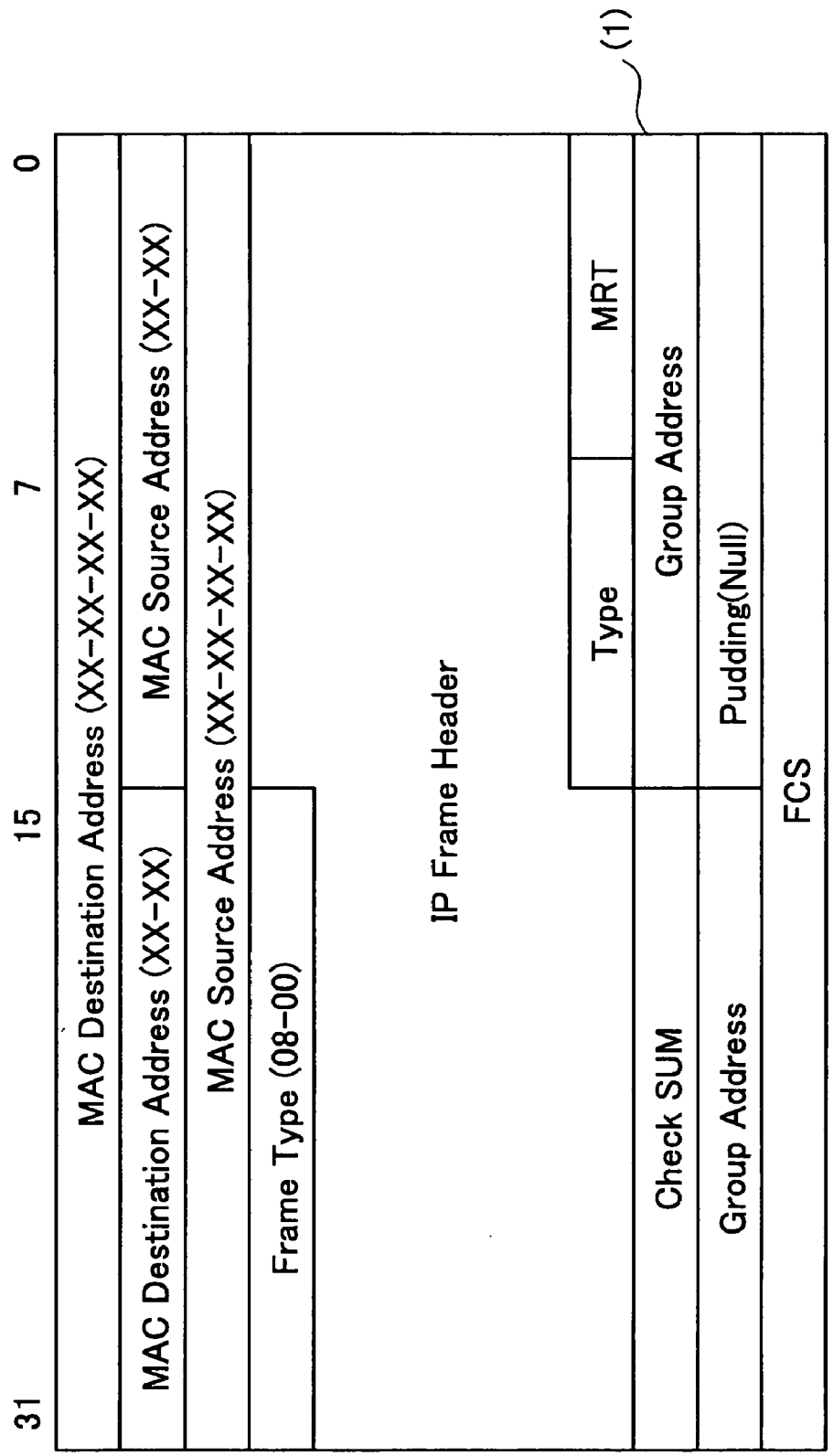

FIG.13B (Packet Length: 64 Bytes)

| ITEM | VALUE | CONTENTS |
|---|---|---|
| MAC Destination Address | 01 00 5E 00 00 01 | <–General Query: Fixed Value |
| | xx-xx-xx-xx-xx-xx | <–Specific Query: Group Address MAC(IGMPv2) |
| MAC Source Address | xx-xx-xx-xx-xx-xx | Multicast Router MAC address |
| Frame Type | 08-00 | IP Packet Designation (Fixed Value) |
| IP Frame Header Information | – | – |
| Source IP Address | xx xx xx xx | Multicast Router IP Address |
| Destination IP Address | E0 00 00 01 | <–General Query: 224.0.0.1 |
| | xx xx xx xx | <–Specific Query: Group Address IP(IGMPv2) |
| Type | 11 | IGMP Frame Type (HMQ) |
| Maximum Response time | xx | HMQ Response Wait Time |
| Check SUM | xxxx | Check Sum Value |
| Group Address | 00 00 00 00 | <–General Query: 0.0.0.0 |
| | xx xx xx xx | <–Group Specific Query: Multicast Group Address |
| Pudding | All 0 | Pudding (Performed if less than 64 Bytes) |

(1)

FIG.14B (Packet Length: 64 Bytes)

| ITEM | VALUE | CONTENTS | |
|---|---|---|---|
| MAC Destination Address | 01 00 5E 00 00 01 | <-General Query: Fixed Value | |
| | XX-XX-XX-XX-XX-XX | <-Specific Query:Group Address MAC | (2) |
| MAC Source Address | XX-XX-XX-XX-XX-XX | Host Apparatus MAC address | |
| Frame Type | 08-00 | IP Packet Designation (Fixed Value) | |
| IP Frame Header Information | – | – | |
| Source IP Address | xx xx xx xx | Host-IP Address | |
| Destination IP Address | xx xx xx xx | <-Group Address IP (IGMPv2) | |
| Type | 12 | <-IGMP Frame Type (HMQ) IGMPv1 | |
| | 16 | " IGMPv2 | |
| Maximum Response time | – | HMQ Response Wait Time (not used) | |
| Check SUM | XXXX | Check Sum Value | |
| Group Address | XX XX XX XX | Multicast Group Address | (1) |
| Pudding | All 0 | Pudding (Performed if less than 64 Bytes) | |

FIG.15B (Packet Length: 64 Bytes)

| ITEM | VALUE | CONENTS |
|---|---|---|
| MAC Destination Address | XX-XX-XX-XX-XX-XX | Host Apparatus MAC Address |
| MAC Source Address | XX-XX-XX-XX-XX-XX | L2-SW Apparatus MAC Address |
| Frame Type | 90-00 | Loop Packet Designation (Dedicated for L2-SW <-> Bu) |
| CODE | 0000 0100 | Multicast Request/Reply |
| ID | 1 | Bu Identification Number |
| Rev | xx | Bu Apparatus Version |
| MODE | 0010 0000 | Multicast (IGMP Snoop) Mode |
| | xxxX XXxx | Multicast Table Information |
| SET-TPID | XX-XX | Don't Care |
| SPriority | xxx | Don't Care |
| SCFI | X | Don't Care |
| SET-VID | xxxx xxxx xxxx | Don't Care |
| SET Multicast1 | 0000 0000 0000 | Multicast 1 Address that Bu transfers |
| SET Multicast2 | 0000 0000 0000 | Multicast 2 Address that Bu transfers |
| SET Multicast3 | 0000 0000 0000 | Multicast 3 Address that Bu transfers |
| Pudding | All 0 | Pudding (Performed if less than 64 Bytes) |

FIG.16A

| | 15 | 7 | 0 |
|---|---|---|---|
| MAC Destination Address (XX-XX-XX-XX) | | | |
| MAC Destination Address (XX-XX) | MAC Source Address (XX-XX) | | |
| MAC Source Address (XX-XX-XX-XX) | | | |
| Frame Type (90-00) | | CODE(04) | ID(XX) |
| Rev(XX) | Mode(XX) | SET-TPID | |
| SPriority | SCFI | SET-VLAN ID | |
| SET-Multicast1(XX-XX-XX-XX) | | SET-Multicast1(XX-XX) | |
| SET-Multicast2(XX-XX-XX-XX) | | | |
| SET-Multicast2(XX-XX) | | SET-Multicast3(XX-XX) | |
| SET-Multicast3(XX-XX-XX-XX) | | | |
| Pudding(Null) | | | |
| FCS | | | |

(4) spans CODE(04)/Mode(XX)/SCFI region; (5) spans ID(XX)/SET-TPID/SET-VLAN ID region

FIG.16B (Packet Length: 64 Bytes)

| ITEM | VALUE | CONTENTS |
|---|---|---|
| MAC Destination Address | XX-XX-XX-XX-XX-XX | L2-SW Apparatus MAC Address |
| MAC Source Address | XX-XX-XX-XX-XX-XX | MAC Address of Bu that has learned Host Apparatus MAC Address |
| Frame Type | 90-00 | Same as Request Packet (Dedicated for L2-SW <-> Bu) |
| CODE | 0000 0100 | Same as Request Packet |
| ID | 1 | Bu Identification Number |
| Rev | xx | Bu Apparatus Version |
| Mode | xxxx xxxx | Same as Request Packet |
| SET-TPID | xx-xx | Don't Care |
| SPriority | xxx | Don't Care |
| SCFI | x | Don't Care |
| SET-VID | xxxx xxxx xxxx | Same as Request Packet |
| SET Multicast1 | 0000 0000 0000 | Same as Request Packet |
| SET Multicast2 | 0000 0000 0000 | Same as Request Packet |
| SET Multicast3 | 0000 0000 0000 | Same as Request Packet |
| Pudding | All 0 | Pudding (Performed if less than 64 Bytes) |

FIG.17A

| | 0 | 7 | 15 | 31 |
|---|---|---|---|---|
| | MAC Destination Address (XX-XX-XX-XX) | | | MAC Destination Address (XX-XX) |
| | MAC Source Address (XX-XX-XX-XX) | | | |
| | MAC Source Address (XX-XX-XX-XX) | | | |
| (4) | Frame Type (90-00) | | CODE(04) | ID(XX) |
| (5) | Rev(XX) | Mode(XX) | SET-TPID | |
| | SPriority | SCFI | SET-VLAN ID | |
| | SET-Multicast1(XX-XX-XX-XX) | | | SET-Multicast1(XX-XX) |
| | SET-Multicast2(XX-XX-XX-XX) | | | |
| | SET-Multicast2(XX-XX) | | SET-Multicast3(XX-XX-XX-XX) | |
| | SET-Multicast3(XX-XX) | | | |
| | Pudding(Null) | | | |
| | FCS | | | |

FIG.17B (Packet Length: 64 Bytes)

| ITEM | VALUE | CONTENTS |
|---|---|---|
| MAC Destination Address | XX-XX-XX-XX-XX-XX | Bu-MAC Address |
| MAC Source Address | XX-XX-XX-XX-XX-XX | L2-SW Apparatus MAC address |
| Frame Type | 90-00 | Loop Packet Designation (dedicated for L2-SW <-> Bu) |
| CODE | 0000 0100 | Multicast Request/Reply |
| ID | XX | Don't Care |
| Rev | XX | Don't Care |
| Mode | xx0x xxxx | Multicast Transparent Mode |
|  | xx1x xxxx | Multicast (IGMP Snoop) Mode |
|  | xxx1 11xx | All Tables Valid |
|  | xxx1 00xx | Only SET-Multicast 1 Valid |
|  | xxx0 10xx | Only SET-Multicast 2 Valid |
|  | xxx0 01xx | Only SET-Multicast 3 Valid |
|  | xxx1 10xx | SET-Multicast 1, 2 Valid |
|  | xxx1 01xx | SET-Multicast 1, 3 Valid |
|  | xxx0 11xx | SET-Multicast 2, 3 Valid |
|  | xxx0 00xx | All Tables Invalid |
| SET-TPID ~ SET-VID | 32bit | Don't Care |
| SET Multicast1 | 0000 0000 0000 | Indicating Multicast 1 Address that Bu passes transparently |
| SET Multicast2 | 0000 0000 0000 | Indicating Multicast 2 Address that Bu passes transparently |
| SET Multicast3 | 0000 0000 0000 | Indicating Multicast 3 Address that Bu passes transparently |
| Pudding | All 0 | Pudding (Performed if less than 64 Bytes) |

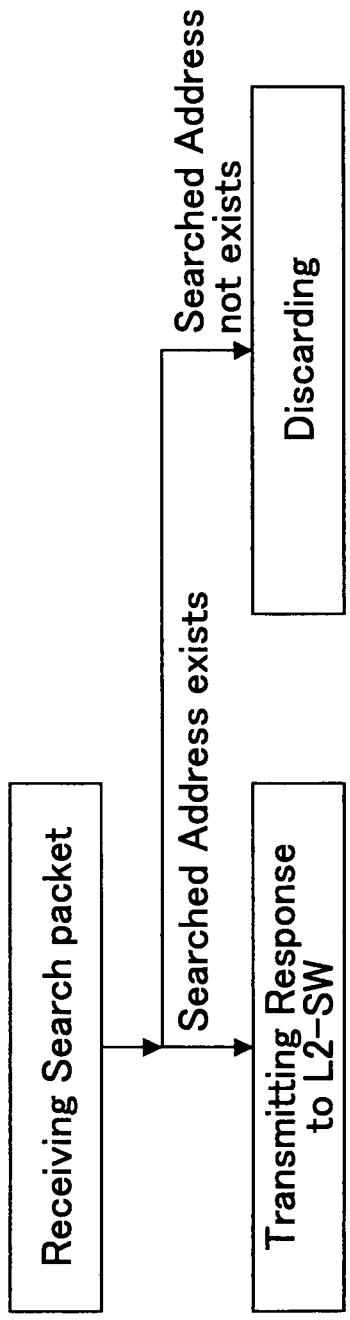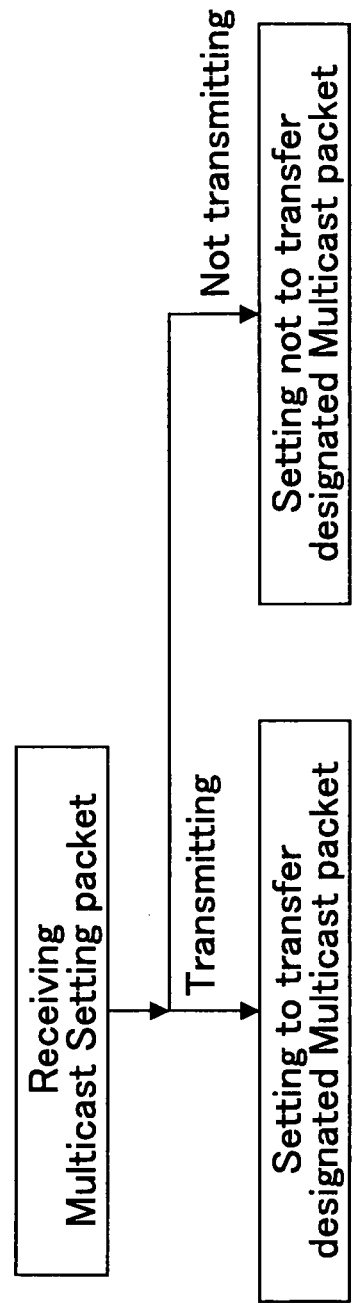

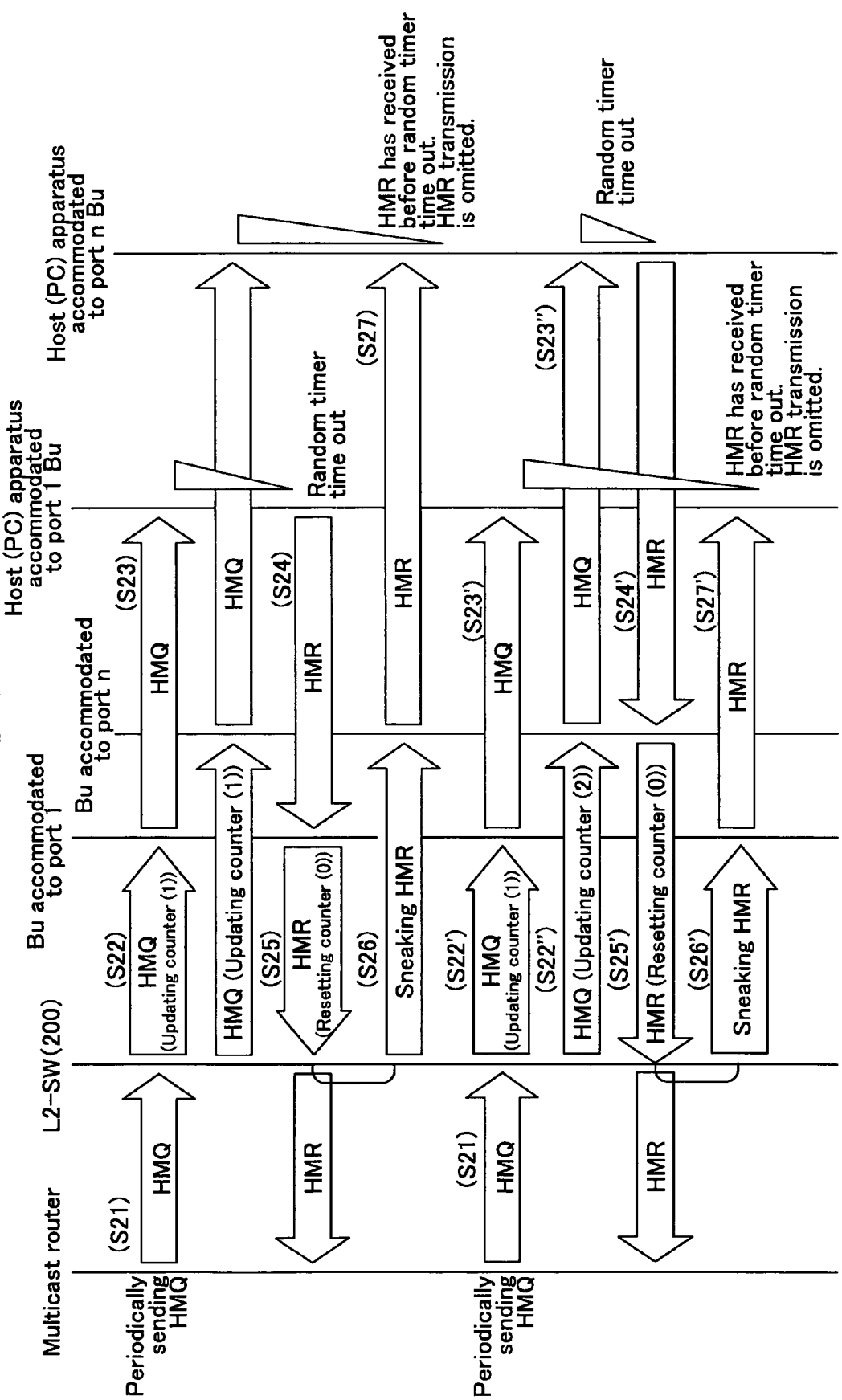

SYSTEM AND APPARATUS THEREOF FOR ETHERNET PON COMMUNICATION

CROSS-REFERENCES TO RELATED APPLICATIONS

This application is a U.S. continuation application filed under 35 USC 111(a) claiming benefit under 35 USC 120 and 365(c) of PCT application JP03/04116, filed Mar. 31, 2003. The foregoing application is hereby incorporated herein by reference.

BACKGROUND OF THE INVENTION

1. Field of the Invention

The present invention generally relates to a communication system and a communication apparatus and, more particularly, to a communication system in which a station-side terminal apparatus and multiple subscriber-side terminal apparatuses are connected via a coupler.

2. Description of the Related Art

An example of a communication system in which a station-side terminal apparatus and multiple subscriber-side terminal apparatuses are connected via a coupler includes a LAN system built with optical paths having multicast function, for example. FIG. 1 shows such a LAN system including a station-side optical terminal apparatus (L2-SW for example) 10 and a multicast router 50. "L2-SW" means a known layer 2 LAN switch provided with multiple subscriber ports 1, 2, ..., n. A host apparatus (a personal computer PC for example) is connected to each subscriber port via a subscriber optical terminal apparatus 21, 22, ..., 2n.

When distributing multicast packet data, the multicast router 50 generally determines whether there is a host apparatus that desires to receive the multicast packet data is connected to a port, and distribute the multicast packet data to the port to which a host apparatus that desires to receive the multicast packet is connected. A packet called Host Membership Query (hereinafter referred to as HMQ) is used for determining whether there is a host apparatus that desires to receive the multicast packet data is connected to a port, and a packet called Host Membership Report (hereinafter referred to as HMR) is used for responding to the HMQ. This HMQ is periodically transmitted from the multicast router regardless of whether distribution is made or not in order to establish procedures for new distribution of multicast data and inquire a host apparatus whether to continue to receive distribution. The above procedures are referred to as Internet Group Management Protocol (IGMP). For example, patent document No. 1 discloses a communication system using the IGMP.

Since the IGMP is a upper rank protocol to the function of L2-SW 10, L2-SW 10 does not analyze IGMP packets. As a result, if there is a host apparatus Hi accommodated to the L2-SW 10 that is receiving multicast distribution, processing of the multicast distribution is added to communication processing of the L2-SW 10. So-called IGMP snooping technique is applicable to this problem. The IGMP snooping allows the L2-SW 10 to acquire and analyze IGMP packets which are essentially in the upper layer than the L2-SW 10, and distribute data to particular ports of the L2-SW based on the result of the analysis. If such IGMP snooping technique is used, the L2-SW 10 can identify the particular ports of the L2-SW 10 to which the data is to be distributed by snooping the HMR from the host apparatus Hi, and selectively transfer the multicast packet data only to the particular ports.

FIG. 2 is a schematic diagram showing a so-called Ether PON system as an example of the LAN system using optical transmission paths in which multicast function is employed as described above. The Ether PON system is a communication system in which known Ethernet (trade mark) technology and PON (Passive Optical Network) technology are integrated. In the case of the Ether PON system, subscriber-side ports 1, 2, ..., n–1, n are connected to multiple subscriber-side terminal apparatuses (referred to as Branch Units, or BU in short).

(Patent Document 1) Japanese Patent Laid-Open Application No. 2000-4251

As shown in FIG. 1, in the case of a conventional L2-SW that does not use optical couplers, since there is only one host apparatus accommodated to one port, data can be distributed using the IGMP snooping without any problem. However, in the case of the PON system shown in FIG. 2, there are multiple host apparatuses accommodated to a port via an optical coupler. As a result, even if a particular port is identified by the snooping analysis of HMR, the L2-SW 10 cannot determine which host apparatus accommodated to the particular port has transmitted the HMR. Consequently, the multicast packet is transmitted to all host apparatuses H1, H2, ..., Hk accommodated to the particular port 1, for example, as shown in FIG. 2. This multicast packet reaches to the layer 3 terminal function unit of all host apparatuses, but only the host apparatus that has transmitted the HMR (the host apparatus Hi in this case) receives the multicast packet (distribution data) at application level. However, the other host apparatuses that have not transmitted the HMR (the host apparatuses H1, ..., Hi–1, Hi+1, ..., Hk in this case) also need to handle the distribution data unnecessarily.

FIG. 3 is a schematic diagram showing the flow of the HMR in the communication system shown in FIG. 2. Even if there are multiple host apparatuses Hi through Hj requesting for the distribution data accommodated to the same router 50, IGMP requires that only one of the HMRs transmitted by the multiple host apparatuses be snooped. Therefore, the communication system is designed such that only a representative host apparatus transmits a HMR and the other host apparatuses do not need to transmit HMRs even if the other host apparatuses desire to receive the distribution data. That is, according to the specification of IGMP, it is required that each host apparatus transmits a HMR a random time period measured by its random timer after the receipt of a HMQ from the router. This requirement allows a host apparatus the random timer of which times-out at first transmits a HMR as a representative to all ports of the L2-SW 10 and the router 50. The other host apparatuses that is to transmit HMRs after the time out of their random timer cancel their transmission of the HMRs in response to the receipt of the HMR transmitted by the representative host apparatus through the ports of the L2-SW 10.

Thus, once a HMR is transmitted from a representative port, the transmission of HMRs from the other ports is canceled. The transmission of a HMR from a host apparatus that desires to receive distribution data is also canceled. As a result, the transmission of distribution data to the host apparatus that desired to receive distribution data may be terminated.

If a host apparatus requests to terminate data distribution, the host apparatus transmits a Leave packet indicating the request to terminate data distribution. In response to receipt of the Leave packet, the router 50 performs a sequence for confirming the termination of data distribution. The router 50 transmits a HMQ for confirmation at first. If the L2-SW 10 receives HMRs less than a predetermined times from a particular port in response to transmission of the HMQ, the L2-SW 10 terminates the data transmission to the particular port. In this case, the request to terminate data distribution from a host apparatus may be disregarded, and consequently the data distribution may be continued. The host apparatus that desires to terminate the data distribution needs to receive the distribution data unnecessarily. That is, after the host apparatus transmits the Leave packet, the L2-SW 10 needs to perform the sequence for confirmation as described above. Accordingly, the L2-SW requires a time period for performing the sequence for confirmation before terminating the data distribution.

SUMMARY OF THE INVENTION

The present invention is made in consideration of the above problems. A first object of the present invention is to provide a communication system in which a station-side terminal apparatus and multiple host apparatuses are coupled by a coupler via a subscriber-side terminal apparatus wherein, when making data distribution using multicast technique, the communication system can effectively avoid unnecessary data distribution to a host apparatus that does not desire to receive distribution data by discriminating a host apparatus that desires to receive distribution data from a host apparatus that does not desire to receive distribution data.

A second object of the present invention is to provide a communication system in which, when making data distribution using multicast technique, a packet for requesting data distribution or a packet for requesting the termination of data distribution from a host apparatus sneak to other host apparatuses and the other host apparatuses cancels the distribution of those packets, wherein the communication system can avoid the erroneous termination or continuation of data distribution by discriminating a port to which the data distribution is to be continued from a port to which the data distribution is to be terminated.

To achieve at least one of the above objects, the subscriber-side terminal apparatus, in response to receipt of a packet (request packet) requesting data distribution form a host apparatus, transfers the request packet to a router, and acquires host identification information contained in the request packet. When the router transmits a packet (acknowledge packet) in response to the request packet containing the host identification information, the subscriber-side terminal apparatus can identify the acknowledge packet by matching the identification information and, if the acknowledge packet is successfully identified, returns the acknowledge packet to the router after attaching its own identification information thereto. In response, the router transmits a packet (designation packet) to the subscriber-side terminal apparatus identified by the identification information thereby to designate an address to which data distribution is to be performed. The subscriber-side terminal apparatus, in response to receipt of the designation packet, retains the address designated in the designation packet, and transfers data distributed to the address to the host apparatus accommodated to the subscriber-side terminal apparatus.

Thus, the subscriber retains the identification information of the host apparatus in response to receipt of the request packet, and returns its own identification information to the router in response to receipt of a inquiry packet. According to the above arrangements, the router can identify the subscriber-side terminal apparatus accommodating the host apparatus that has transmitted the request packet. The router transmits the designation packet designating the address to which distribution data is to be transferred, to the identified subscriber-side terminal apparatus. Distribution data addressed to the above address transmitted to the same port is transferred to the host apparatus accommodated to the subscriber-side terminal apparatus to which the address is designated by the subscriber-side terminal apparatus. The distribution data is discarded by the subscriber-side terminal apparatus and is not transferred to the other host apparatuses accommodated thereto because the addresses of other host apparatuses are not designated. As a result, the host apparatus that does not desire to receive distribution data does not need to receive unnecessary distribution data.

Similarly, the subscriber-side terminal apparatus, in response to receipt of a packet requesting the termination of data distribution, transfers the packet to the router, and acquires the host identification information contained in the packet. When an acknowledge packet to which the host identification information is contained is transmitted by the router as a response to the above packet, the subscriber-side terminal apparatus can identify the acknowledge packet using the host identification information. If the acknowledge packet is identified successfully, the subscriber-side terminal apparatus returns the received acknowledge packet to the router after containing its own identification information therein. In response, the router transmits a designation packet designating an address to which distribution data is not to be distributed, to the subscriber-side terminal apparatus identified by the identification information. The subscriber-side terminal apparatus retains the address to which distribution data is not to be distributed, and discards data distributed to the above address without transferring the data to the host apparatus accommodated thereto.

Thus, the subscriber-side terminal apparatus, in response to receipt of the packet requesting the termination of data distribution, retains the identification information of the host apparatus. According to the above arrangements, the subscriber-side terminal apparatus can respond to an inquiry packet from the router, and return its own identification information to the router. As a result, the router can identify a subscriber-side terminal apparatus accommodating the host apparatus that has transmitted the packet requesting for the termination of data distribution. The router transmits the designation packet designating the address to which distribution data is not to be transferred, to the identified subscriber-side terminal apparatus. Distribution data addressed to the above address transmitted to the same port is not transferred to the host apparatus accommodated to the subscriber-side terminal apparatus to which the address is designated by the subscriber-side terminal apparatus. The distribution data is discarded by the subscriber-side terminal apparatus and is not transferred to the host apparatus. The distribution data is transferred to the other host apparatus because the addresses of the other host apparatuses are not designated. As a result, the host apparatus that requests for the termination of distribution data does not need to receive unnecessary distribution data.

In addition, the station-side terminal apparatus may be provided with a counter for each subscriber-side terminal apparatus accommodated thereto. The counter may be incremented every time a packet for checking whether data distribution is required or not is transmitted, and is reset to zero when the station-side terminal apparatus receives a packet requesting for data distribution from the subscriber-side terminal apparatuses. The data distribution is terminated to the subscriber-side terminal apparatus of which counter has counted out.

The counter provided for each subscriber-side terminal apparatus allows the station-side terminal apparatus to determine whether the subscriber-side terminal apparatus requests for data distribution or not. According to the above arrangements, the case in which data distribution to a subscriber-side terminal apparatus that desires to receive distribution data is erroneously terminated and the case in which data distribution to a subscriber-side terminal apparatus that desires to terminate the receiving of distribution data is not erroneously continued for a long time can be avoided.

BRIEF DESCRIPTION OF DRAWINGS

Other features and advantages of the present invention will become more apparent from the following detailed description when read in conjunction with the accompanying drawings.

FIG. 10 is a second sequence diagram for explaining operation to terminate multicast transmission using a Leave packet according to an embodiment of the present invention;

FIG. 11 is a second sequence diagram for explaining operation to avoid the erroneous termination of data distribution according to an embodiment of the present invention;

FIG. 12 is a second sequence diagram for explaining operation to avoid the erroneous continuation of data distribution according to an embodiment of the present invention;

FIGS. 13A and 13B are data diagrams for explaining the packet format of a HMQ;

FIGS. 14A and 14B are data diagrams for explaining the packet format of a HMR;

FIGS. 15A and 15B are data diagrams for explaining the packet format of a search frame transmitted to a subscriber-side terminal apparatus;

FIGS. 16A and 16B are data diagrams for explaining the packet format of a response frame transmitted in response to the search frame;

FIGS. 17A and 17B are data diagram for explaining the packet format of a multicast setting frame transmitted in response to the response frame;

FIGS. 18A through 18E are flowcharts showing operation of a subscriber terminal apparatus;

FIG. 20 is a third sequence diagram for explaining operation to avoid the erroneous termination of data distribution according to an embodiment of the present invention.

DETAILED DESCRIPTION OF PREFERRED EMBODIMENTS

Embodiments of the present invention are described in detail below.

The overview of embodiments of the present invention is described first. According to an embodiment of the present invention, a station-side terminal apparatus L2-SW has the following functions.

1) Function for searching, in response to receipt of a HMR, a subscriber-side terminal apparatus BU to which a host apparatus that has transmitted the HMR.
2) Function for searching, in response to receipt of a Leave packet, a subscriber-side terminal apparatus BU to which a host apparatus that has transmitted the Leave packet.
3) Function for requesting a predetermined subscriber-side terminal apparatus BU to transfer packets having a designated multicast address to host apparatus accommodated to the station-side terminal apparatus L2-SW.
4) Function for requesting a predetermined subscriber-side terminal apparatus BU not to transfer packets having a designated multicast address to host apparatuses accommodated to the station-side terminal apparatus L2-SW.
5) Function for monitoring HMRs transmitted as a response to the HMQ transmitted to a subscriber-side terminal apparatus BU.

Each subscriber-side terminal apparatus BU has the following functions.

1) Function for acquiring a MAC address of a host apparatus contained in a HMR or a Leave packet transmitted by the host apparatus accommodated to the subscriber-side terminal apparatus BU.
2) Function for informing, in response to receipt of a HMR, a station-side terminal apparatus whether there is a host apparatus accommodated to the subscriber-side terminal apparatus BU, the host apparatus having transmitted the HMR, in accordance with a request from the upper station-side terminal apparatus L2-SW.
3) Function for informing, in response to receipt of a Leave packet, a station-side terminal apparatus whether there is a host apparatus accommodated to the subscriber-side terminal apparatus BU, the host apparatus having transmitted the Leave packet, in accordance with a request from the upper station-side terminal apparatus L2-SW.
4) Function for transferring received multicast packets having a designated multicast address to host apparatuses accommodated to the subscriber-side terminal apparatus BU in accordance with a request from the station-side terminal apparatus L2-SW.
5) Function for not transferring received multicast packets having a designated multicast address to host apparatuses accommodated to the subscriber-side terminal apparatus BU in accordance with a request from the station-side terminal apparatus L2-SW.

Figure 1:
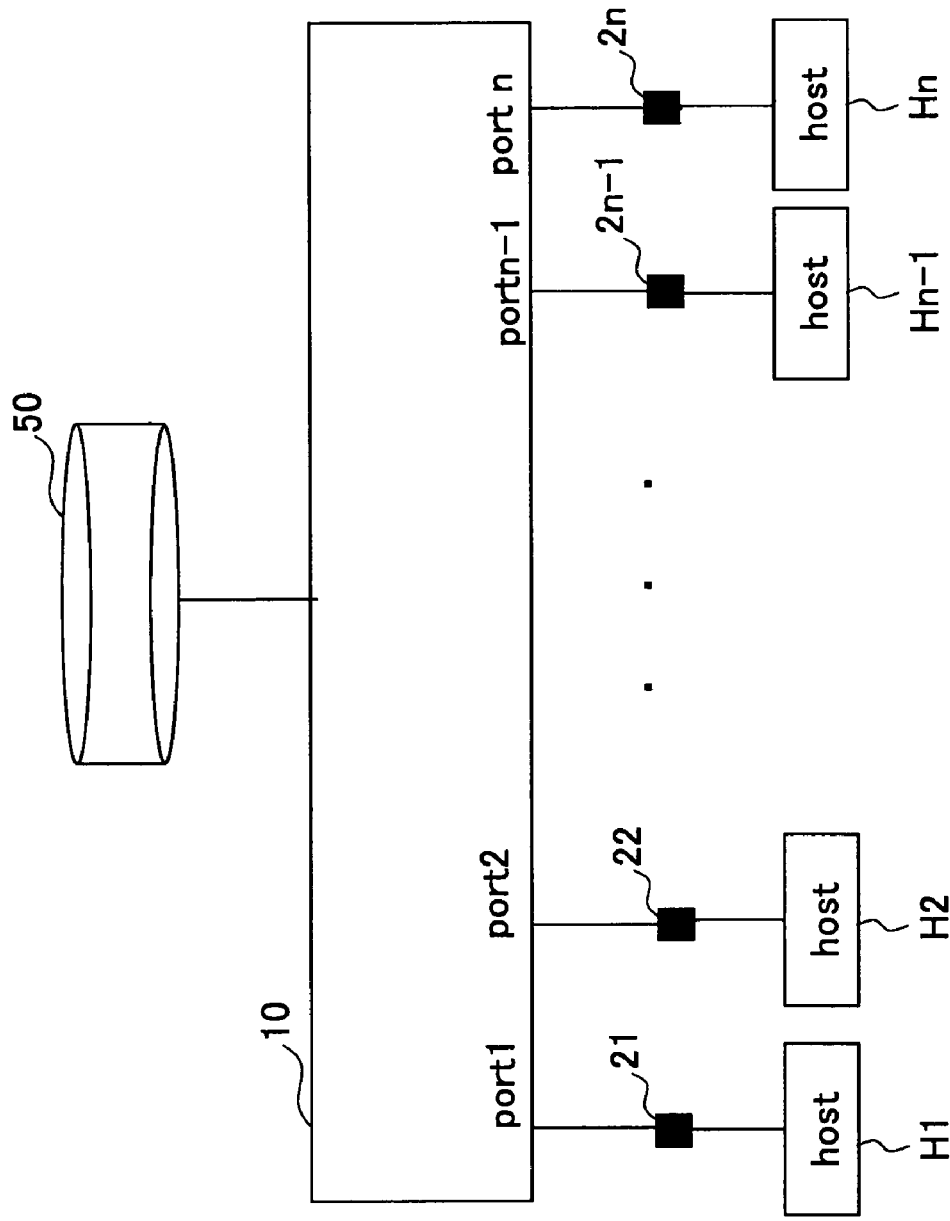
FIG. 1 is a schematic diagram showing the configuration of an optical path communication system using multicast technique.
Figure 2:
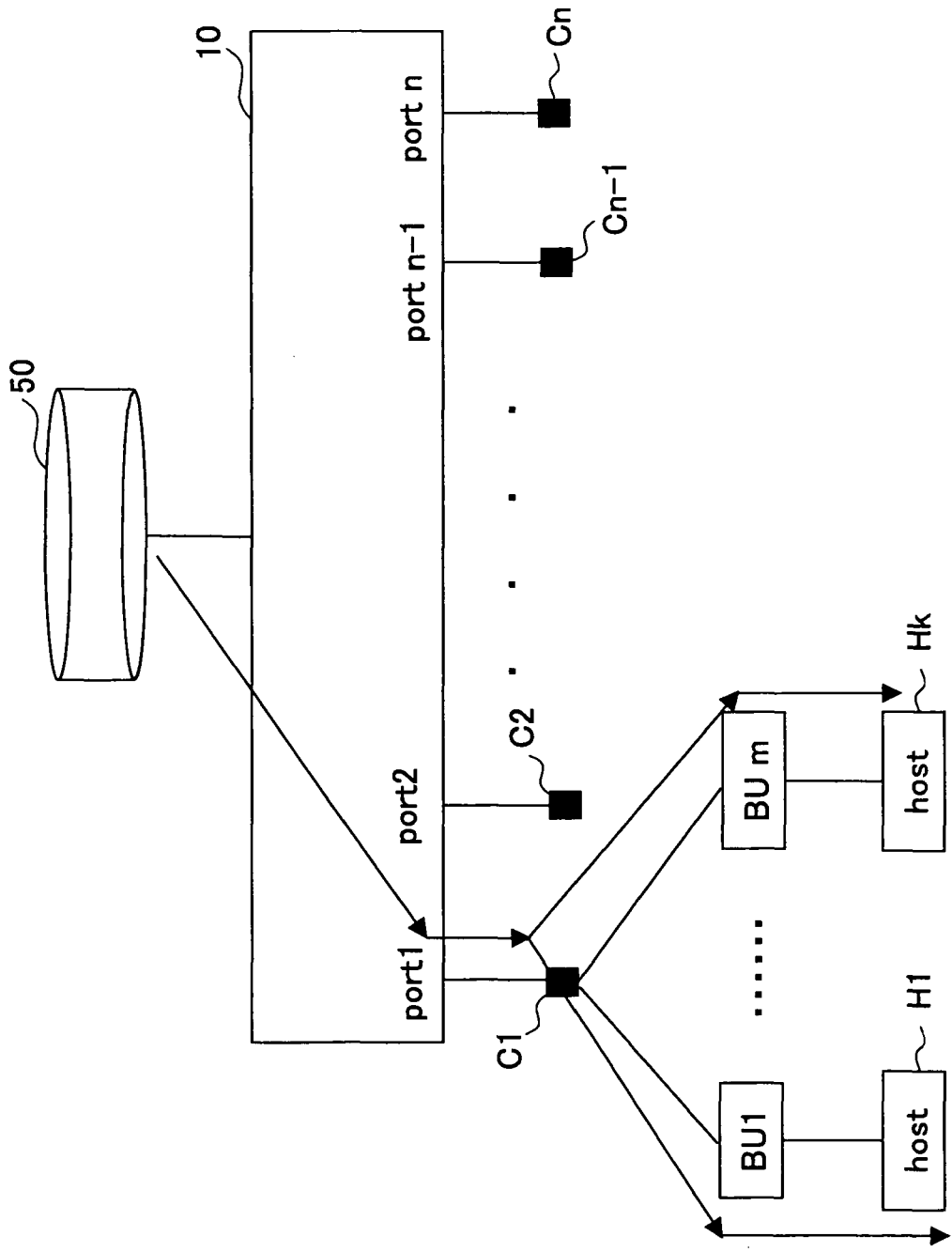
FIG. 2 is a schematic diagram showing the configuration of an optical path communication system in accordance with Ether PON system using multicast technique.
Figure 3:
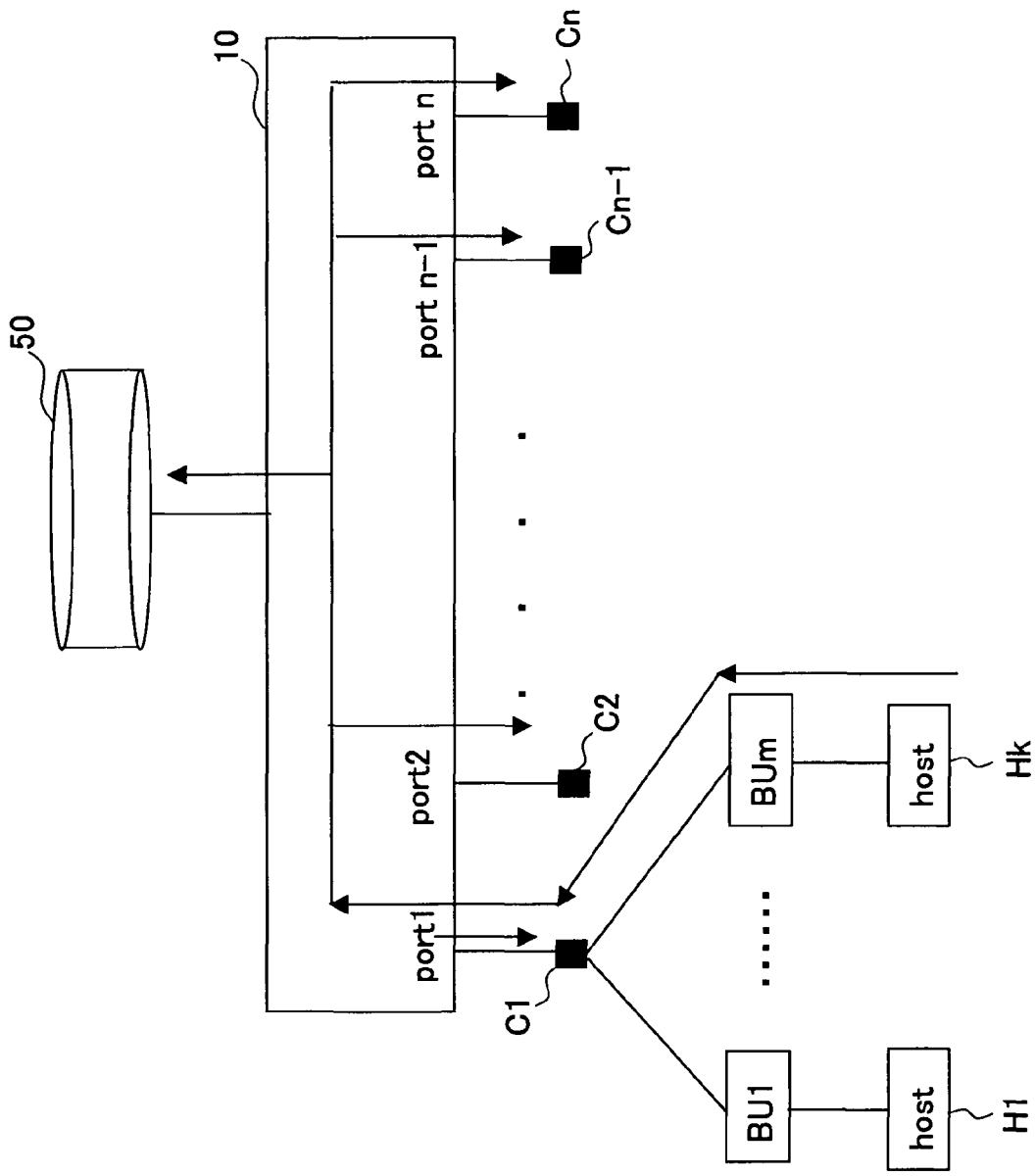
FIG. 3 is a schematic diagram for explaining the sneaking of a HMR in the configuration shown in FIG. 2.
Figure 4:
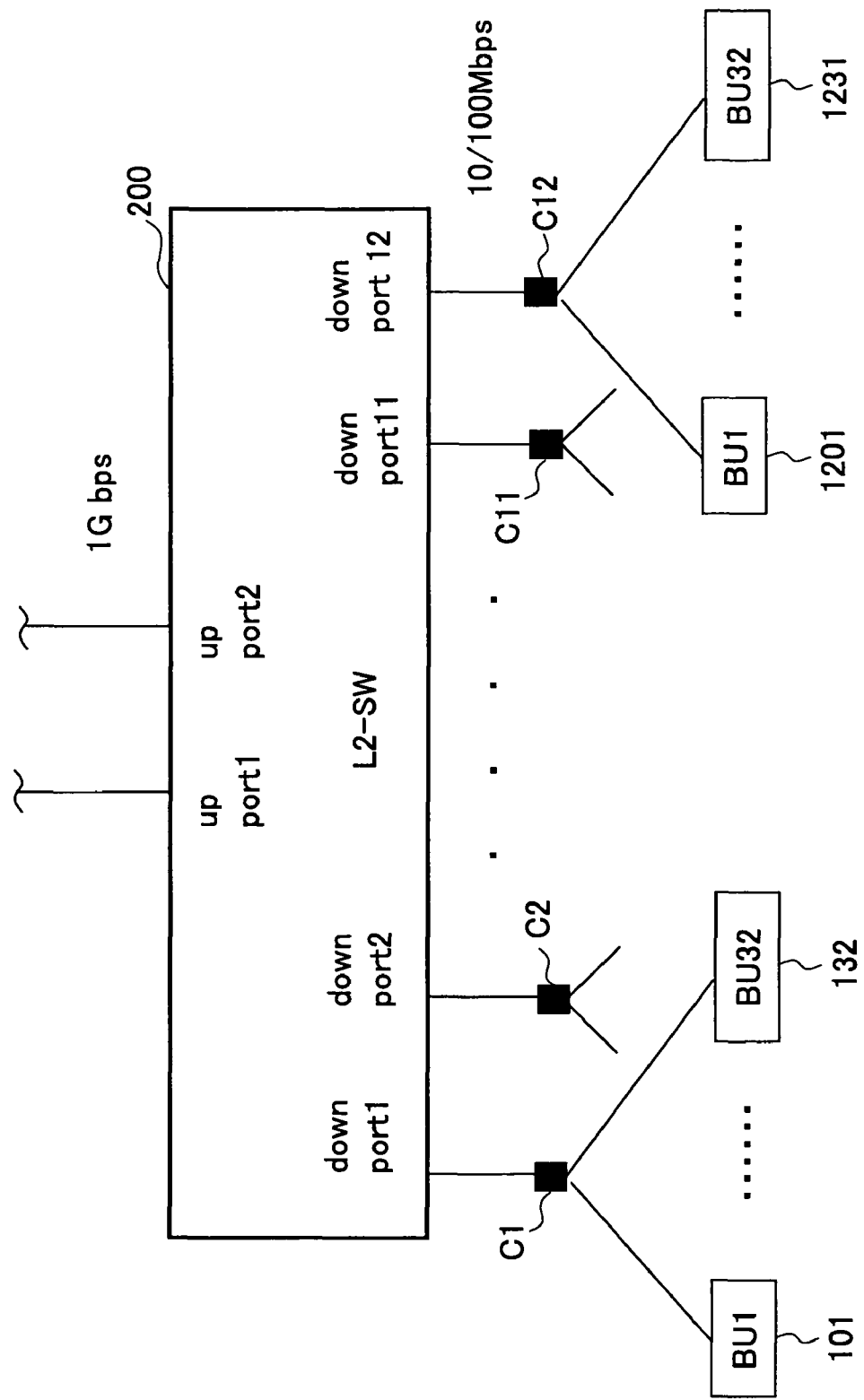
FIG. 4 is a schematic diagram showing the overview of a communication system according to an embodiment of the present invention.

FIG. 4 is a schematic diagram showing the connection of a station-side optical terminal apparatus (L2-SW) 200 having the above functions and multiple subscriber-side optical terminal apparatuses (BU) 101-132, . . . , 1201-1231 each having the above functions. Two 1-Gbps 1000B-SX/LX optical channels connect the station-side terminal apparatus 200 to a upper layer apparatus such as a layer 3 switch, and twelve 10/100FTH channels further connect the station-side terminal apparatus 200 to the subscriber-side terminal apparatuses. At most 32 subscriber-side terminal apparatuses BU can be connected to each port of the station-side terminal apparatus 200 via an optical coupler C1-C12. In total, at most 12×32=384 subscriber-side terminal apparatuses 101-132, ..., 1201-1231 can be connected to the station-side terminal apparatus 200.

An example of the station-side terminal apparatus 200 and the subscriber-side terminal apparatus 101-132, ..., 1201-1231 includes products manufactured by the applicant, an optical access unit GeoStream A550 and an Optical Branch Unit GeoStream A501, respectively. The detailed information of these products is available from a Web site http://telecom.fujitsu.com/jp/.

The station-side terminal apparatus 200 has HMR response waiting counters for respective subscriber-side terminal apparatuses, and updates the counts of the HMR response waiting counters for respective subscriber-side terminal apparatuses in response to receipt of a HMQ packet from the upper rank router. The function of this counter is described below. As described above, if a subscriber-side terminal apparatus does not return a HMR in response to receipt of a HMQ, data distribution to the subscriber-side terminal apparatus needs to be terminated. However, because a HMR transmitted by a subscriber-side terminal apparatus may sneak to the other ports of the station-side terminal apparatus 200 as described above, one or more subscriber-side terminal apparatuses that still desire to receive data distribution may not return a HMR. To solve this problem, the counter is set to count out up to a large counts such that, even if a particular subscriber-side terminal apparatus does not return a HMR soon due to the sneaking of a HMR transmitted by another subscriber-side terminal apparatus, data distribution to the particular subscriber-side terminal apparatus is continued until the particular subscriber-side terminal apparatus returns a HMR.

Thus, if the counter exceeds a predetermined counts (counts out), the station-side terminal apparatus 200 determines that the particular subscriber-side terminal apparatus does not desire to receive data distribution any more, and terminates data distribution to the particular subscriber-side terminal apparatus. That is, the station-side terminal apparatus 200 requests the subscriber-side terminal apparatus to discard packets containing a designated multicast address. The counter is reset in response to receipt of a HMR from the particular subscriber-side terminal. Even if the particular subscriber-side terminal apparatus does not return a HMR due to the sneaking of a HMR from another subscriber-side terminal apparatus as described above, because the particular subscriber-side terminal apparatus waits for a random time period counted by its random timer, the particular subscriber-side terminal apparatus can resolve the condition in which the sneaking HMR makes the particular subscriber-side terminal apparatus not to return a HMR, and return a HMR at certain probability. Once the random counter of the station-side terminal apparatus corresponding to the particular subscriber-side terminal apparatus is reset, data distribution to the particular subscriber-side terminal apparatus is not terminated.

When the station-side terminal apparatus 200 receives a HMR from a subscriber terminal apparatus, the station-side terminal apparatus 200 identifies a "receiving port" at which the station-side terminal apparatus 200 received the HMR, and acquires "MAC address of a host apparatus" and "multicast address" contained in the HMR. Then, the station-side terminal apparatus 200 generates a predetermined frame that terminates at the station-side terminal apparatus 200 or the subscriber-side terminal apparatus, and transmits the predetermined frame to the identified receiving port. This predetermined frame contains the acquired "MAC address of a host apparatus" and information about "event meaning the searching of MAC". The subscriber-side terminal apparatus receiving the predetermined frame can know that the predetermined frame is "a frame for the purpose of searching designated MAC address" based on the above information. After transmitting such a frame, the station-side terminal apparatus 200 sets the receiving port at a state "inquiring HMR".

Meanwhile, the function of each subscriber-side terminal apparatus is described below. When a subscriber-side terminal apparatus receives a HMR from a host apparatus accommodated thereto, the subscriber-side terminal apparatus acquires the MAC address of the host apparatus. In response to receipt of the predetermined frame for search from the upper ranked station-side terminal apparatus 200, each subscriber-side terminal apparatus determines whether a MAC address contained in the received predetermined frame matches the acquired MAC address of a host apparatus. If they match, the subscriber-side terminal apparatus transmits a response containing its identification (ID) information to the station-side terminal apparatus 200. Otherwise, the subscriber-side terminal apparatus discards the predetermined frame for search.

The station-side terminal apparatus 200 generates a predetermined frame for requesting the subscriber-side terminal apparatus to transfer packets having the multicast address acquired from the HMR to the host apparatus accommodated thereto based on the identification information ID contained in the response frame from the subscriber-side terminal apparatus, and transmits the generated predetermined request frame to the subscriber-side terminal apparatus. If the multicast address of the subscriber-side terminal apparatus is set to be transferred, such a request frame is not transmitted again.

The subscriber-side terminal apparatus is set in response to receipt of the request frame such that the subscriber-side terminal apparatus transfers packets having the acquired multicast address to the host apparatus.

The above Leave packet is handled by the station-side terminal apparatus 200 and the subscriber-side terminal apparatuses 101-131, ..., 1201-1231 in the following manner. When receiving a Leave packet, the station-side terminal apparatus 200 identifies a "receiving port" of the Leave packet, and acquires "MAC address of a host apparatus that has transmitted the Leave packet" contained in the Leave packet and "multicast address" of distribution data.

The station-side terminal apparatus 200 generates a predetermined search frame that terminates at the subscriber-side terminal apparatus, and transmits the search frame to the identified receiving port. The predetermined search frame contains "MAC address of the host apparatus" and "event meaning the searching of MAC address". This information allows the subscriber-side terminal apparatus that has received this search frame to know that the search frame is intended to search the MAC address. After transmitting the search frame, the station-side terminal apparatus 200 sets the receiving port at a state "inquiring Leave".

Meanwhile, when a subscriber-side terminal apparatus receives the Leave packet from a host apparatus accommodated thereto, the subscriber-side terminal apparatus acquires the MAC address of the host apparatus contained in the Leave packet. In response to receipt of the predetermined search frame from the upper ranked station-side terminal apparatus 200, each subscriber-side terminal apparatus determines whether a MAC address contained in the received predetermined frame matches the acquired MAC address of the host apparatus. If they match, the subscriber-side terminal apparatus transmits a response containing its identification (ID) information to the station-side terminal apparatus 200. Otherwise, the subscriber-side terminal apparatus discards the predetermined frame for search.

The station-side terminal apparatus 200 generates a predetermined frame for requesting the subscriber-side terminal apparatus to transfer packets having the multicast address acquired from the Leave packet to the host apparatus accommodated thereto based on the identification information ID contained in the response frame from the subscriber-side terminal apparatus, and transmits the generated predetermined request frame to the subscriber-side terminal apparatus. If the multicast address of the subscriber-side terminal apparatus is already set to be transferred, such a request frame is not transmitted again.

The subscriber-side terminal apparatus is set in response to receipt of the request frame such that the subscriber-side terminal apparatus does not transfer packets having the acquired multicast address to the host apparatus.

Figure 5:
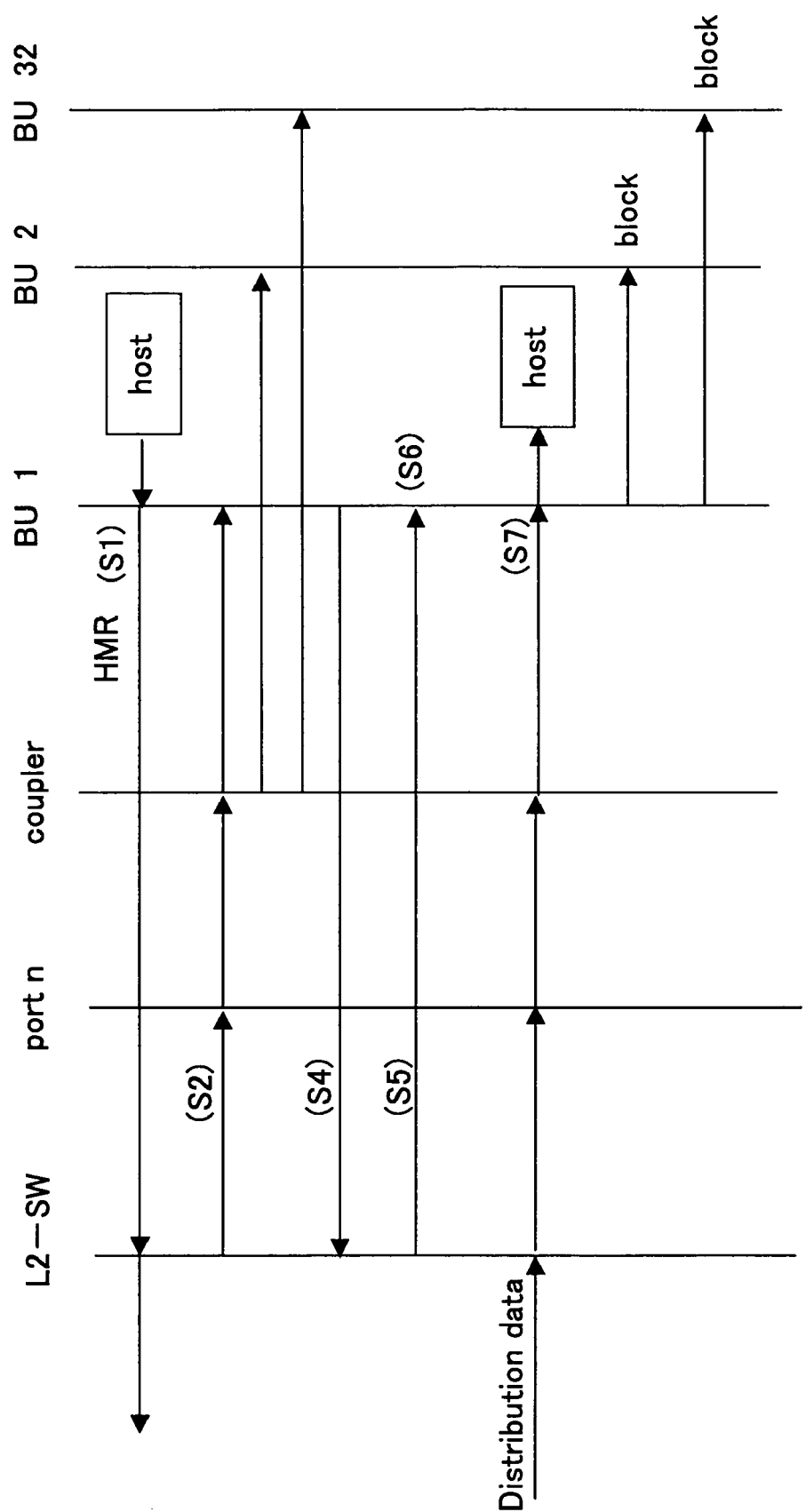
FIG. 5 is a first sequence diagram for explaining operation to set multicast transmission using a HMR according to an embodiment of the present invention.
Figure 9:
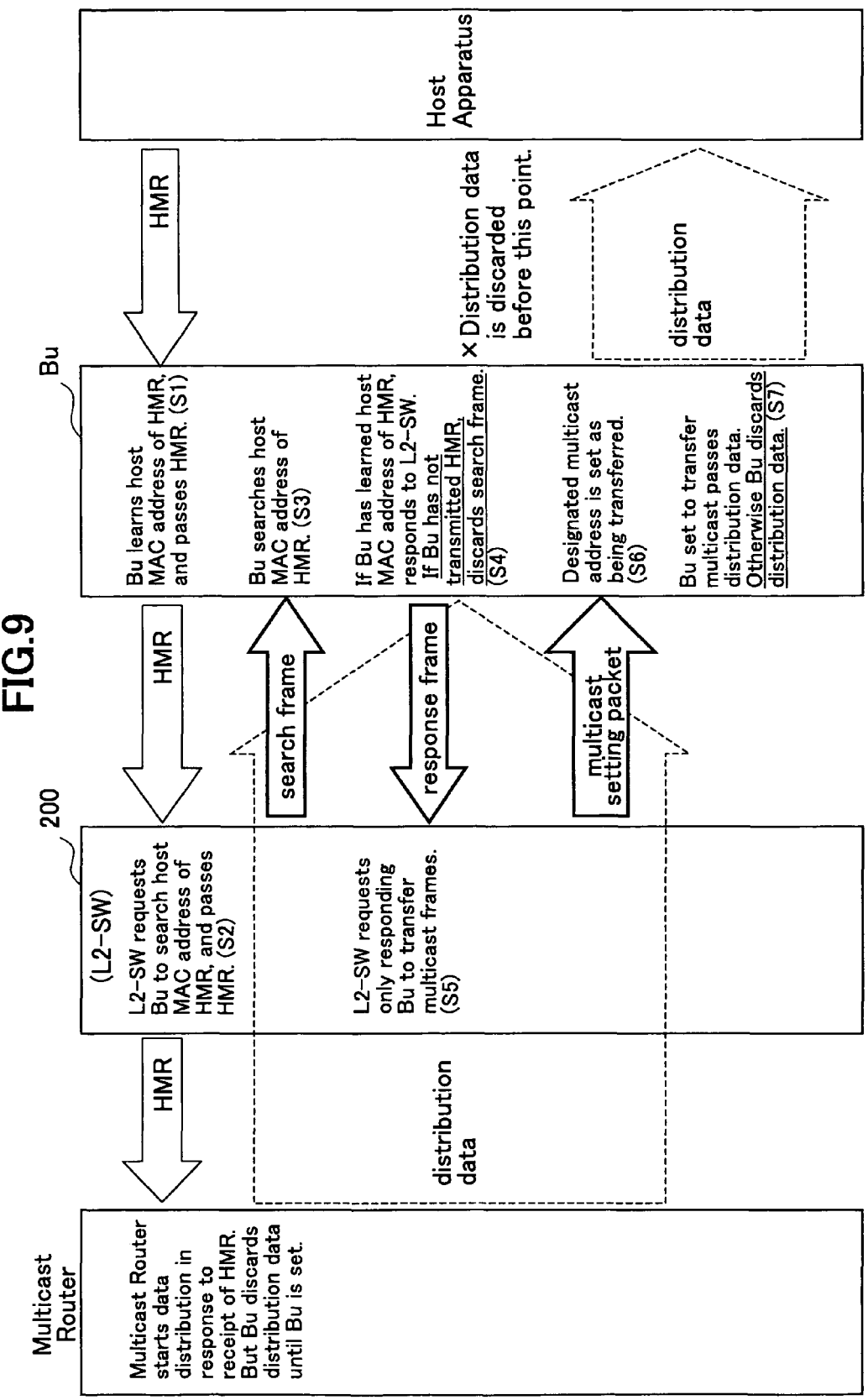
FIG. 9 is a second sequence diagram for explaining operation to set multicast transmission using a HMR according to an embodiment of the present invention.

Referring to FIGS. 5 and 9, operational flow is described below in which a subscriber-side terminal apparatus that has transmitted a HMR is identified by the station-side terminal apparatus 200, and is requested to transfer multicast packets having a predetermined multicast address to the host apparatus accommodated thereto.

The host apparatus transmits a HMR to the subscriber-side terminal apparatus BU1, and the subscriber-side terminal apparatus BU1 learns the multicast address contained in the HMR (step S1). When the station-side terminal apparatus 200 receives this HMR from its port, the station-side terminal apparatus 200 transmits a search frame to the port for inquiring whether any subscriber-side terminal apparatus has transmitted the HMR (step S2). The search frame reaches to all subscriber-side terminal apparatuses BU1, BU2, and BU3 accommodated to the port via a coupler Ci.

The search frame includes the MAC address of a host apparatus that has transmitted the HMR. The subscriber-side terminal apparatus BU1 that has learned the MAC address accepts the search frame, but the other subscriber-side terminal apparatuses BU2, BU3 discard the search frame (step S3). The subscriber-side terminal apparatus B1 sets its identifier in a response frame, and returns the response frame (step S4). The station-side terminal apparatus 200 requests the responding subscriber-side terminal apparatus BU1 to set the responding subscriber-side terminal apparatus BU1 such that the responding subscriber-side terminal apparatus BU1 transfers multicast packets having the multicast address contained in the HMR to host apparatuses accommodated thereto by sending a multicast setting packet (step S5).

The responding subscriber-side terminal apparatus BU1 follows the request of the multicast setting packet and sets the responding subscriber-side terminal apparatus BU1 such that the responding subscriber-side terminal apparatus BU1 transfers multicast packets having the multicast address contained in the HMR to host apparatuses accommodated thereto (step S6). The subscriber-side terminal apparatus BU1 transfers received multicast packets having the multicast address to the host apparatuses accommodated thereto (step S7).

Figure 6:
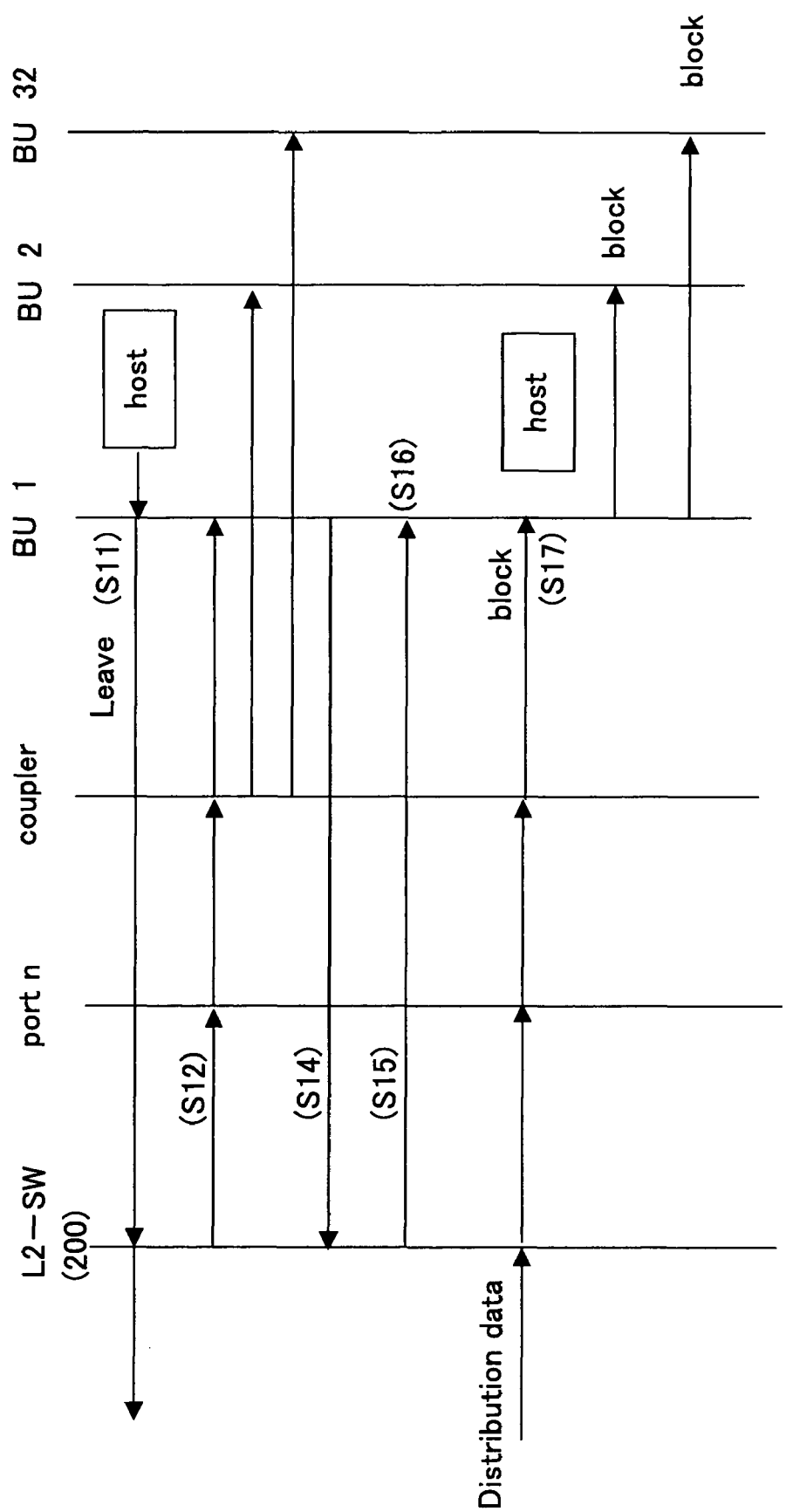
FIG. 6 is a second sequence diagram for explaining operation to terminate multicast transmission using a Leave packet according to an embodiment of the present invention.

Referring to FIGS. 6 and 10, operational flow is described below in which a subscriber-side terminal apparatus that has transmitted a Leave packet is identified by the station-side terminal apparatus 200, and is requested not to transfer multicast packets having a predetermined multicast address to the host apparatus accommodated thereto.

The host apparatus transmits a Leave packet to the subscriber-side terminal apparatus BU1, and the subscriber-side terminal apparatus BU1 learns the multicast address contained in the Leave packet (step S11). When the station-side terminal apparatus 200 receives this Leave packet from its port, the station-side terminal apparatus 200 transmits a search frame to the port for inquiring whether any subscriber-side terminal apparatus has transmitted the Leave packet (step S12). The search frame reaches to all subscriber-side terminal apparatuses BU1, BU2, and BU3 accommodated to the port via a coupler Ci.

The search frame includes the MAC address of a host apparatus that has transmitted the Leave packet. The subscriber-side terminal apparatus BU1 that has learned the MAC address accepts the search frame, but the other subscriber-side terminal apparatuses BU2, BU3 discard the search frame (step S13). The subscriber-side terminal apparatus B1 sets its identifier in a response frame, and returns the response frame (step S14). The station-side terminal apparatus 200 requests the responding subscriber-side terminal apparatus BU1 to set the responding subscriber-side terminal apparatus BU1 such that the responding subscriber-side terminal apparatus BU1 does not transfer multicast packets having the multicast address contained in the Leave packet to host apparatuses accommodated thereto by sending a multicast setting packet (step S15).

The responding subscriber-side terminal apparatus BU1 follows the request of the multicast setting packet and sets the responding subscriber-side terminal apparatus BU1 such that the responding subscriber-side terminal apparatus BU1 does not transfer multicast packets having the multicast address contained in the Leave packet to host apparatuses accommodated thereto (step S16). The subscriber-side terminal apparatus BU1 does not transfer received multicast packets having the multicast address to the host apparatuses accommodated thereto (step S17).

Figure 7:
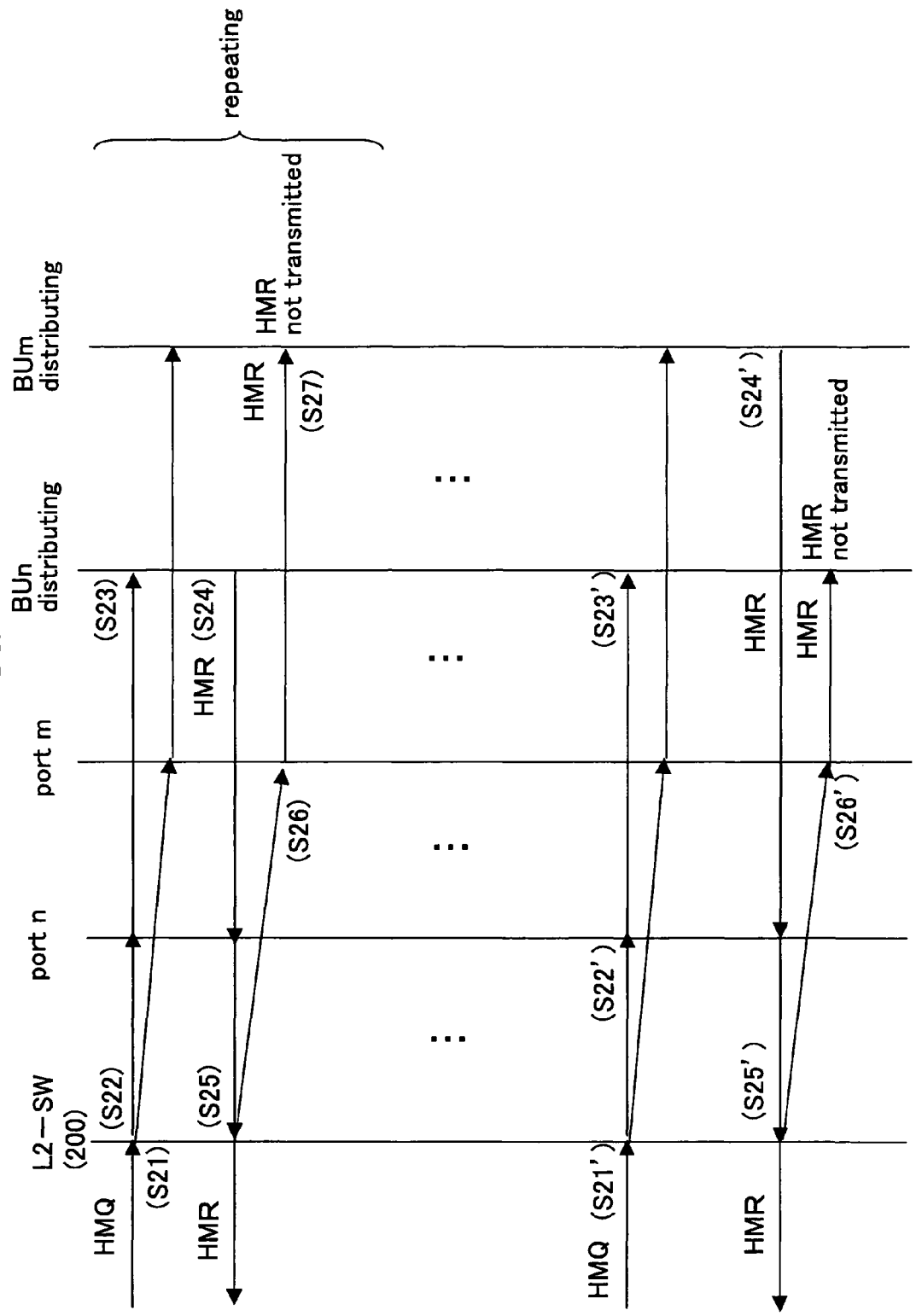
FIG. 7 is a first sequence diagram for explaining operation to avoid the erroneous termination of data distribution according to an embodiment of the present invention.

Referring to FIGS. 7, 11, and 20, described below is a method of avoiding the erroneous termination of data distribution to a host apparatus due to the transmission of a HMR transmitted from another host apparatus via the representative port, in accordance with an embodiment of the present invention. In response to receipt of a HMQ from a upper rank router (step S21), the station-side terminal apparatus (L2-SW) 200 updates the count of a counter provided for each subscriber-side terminal apparatus BU (BU that has already returned a HMR) to which multicast data is being distributed, and transmits a HMQ to the subscriber-side terminal apparatuses accommodated thereto (step S22).

In response to receipt of the HMQ, each subscriber-side terminal apparatus BU transfers the HMQ to the host apparatuses accommodated thereto (step S23). In response to receipt of the transferred HMQ, if the host apparatus desires to continuously receive data distribution indicated in the transferred HMQ, transmits a HMR after a random time period measured by its random timer. In response to receipt of the HMR from the host apparatus, the subscriber-side terminal apparatus BU transfers the HMR to the upper rank station-side terminal apparatus 200 (step S24). In response to receipt of the HMR, the station-side terminal apparatus 200 operates in connection with the port through which the HMR is received in the same manner as described above with reference to FIGS. 5 and 9, and resets the counter corresponding to the subscriber-side terminal apparatus BU that has transmitted the HMR (step S25).

The station-side terminal apparatus 200 does nothing for the other ports through which the HMR has not received. However, the other ports may include a particular port accommodating a host apparatus that desires to receive data distribution but has not transmitted a HMR because the host apparatus has received a sneaking HMR from the representative port (steps S26 and S27) as described above. To solve this problem, since a host apparatus may fail to transmit a HMR due to the sneaking HMR from the representative port, data distribution to the port may not be terminated soon.

The multicast router periodically transmits a HMR, and each transmission of the HMR updates the counter of each subscriber-side terminal apparatus BU (step S21'). In response to receipt of the HMR, each subscriber-side terminal apparatus BU transmits a HMR after a random time period measured by its random timer as described above if the subscriber-side terminal apparatus BU desires to receive data distribution. Thus, even though the subscriber-side terminal apparatus may fail to transmit a HMR due to a sneaking HMR from the representative port, the subscriber-side terminal can transmit a HMR sooner or later (step S24'). As a result, the counter corresponding to the subscriber-side terminal is reset to zero (step S25').

According to the above arrangements, it can be avoided that data distribution to a subscriber-side terminal apparatus BU accommodating such a host apparatus that desires data distribution is erroneously terminated or the termination of data distribution to the subscriber-side terminal apparatus BU is erroneously requested unless the counter of the subscriber-side terminal apparatus BU is reset to zero before the counter counts out. The count of the counter of each subscriber-side terminal apparatus BU at which the counter counts out needs to be adjusted taking it into consideration that there is a port to which a host apparatus is accommodated, the host apparatus being unable to transmit a HMR due to a sneaking HMR from another port.

Figure 8:
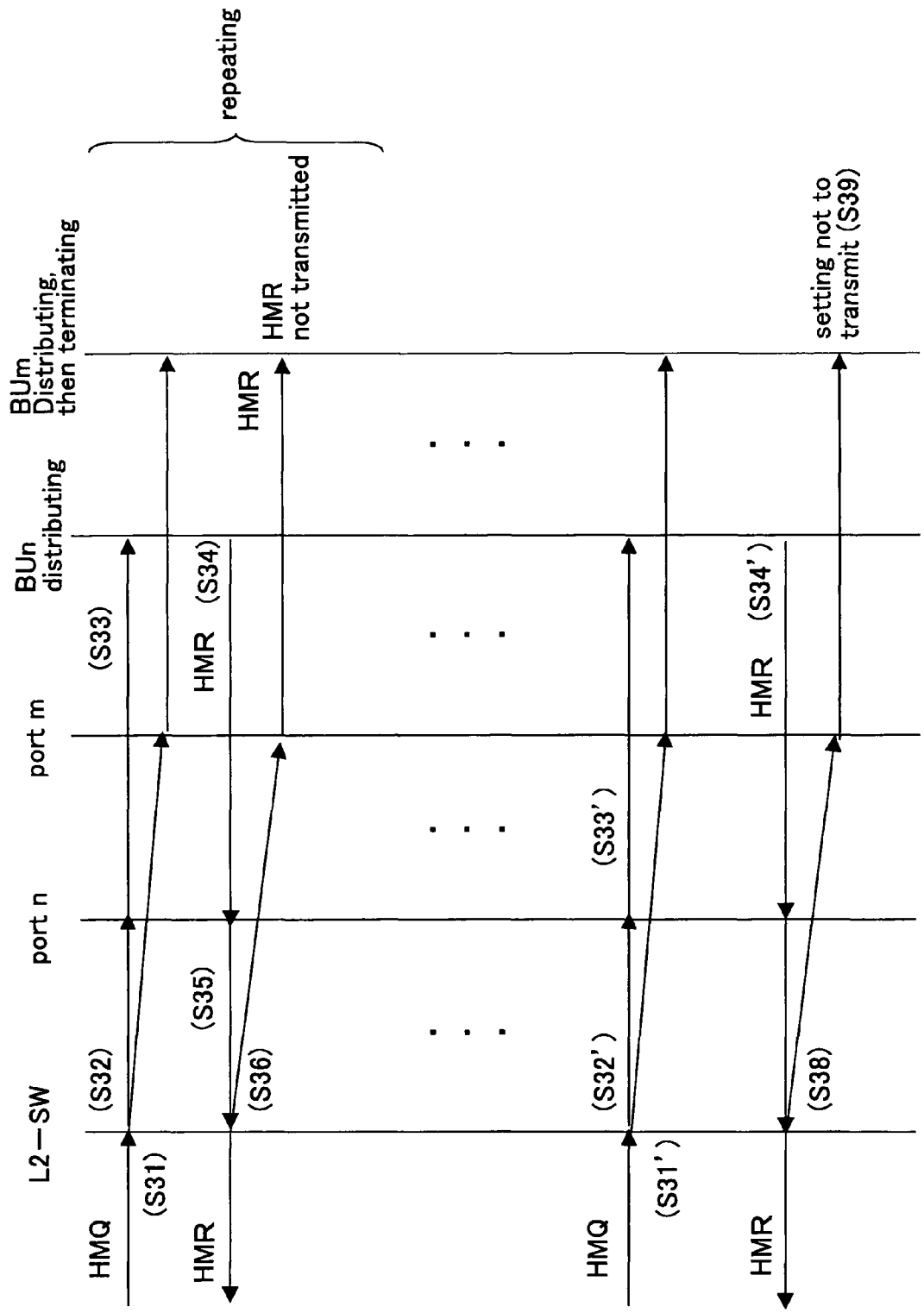
FIG. 8 is a first sequence diagram for explaining operation to avoid the erroneous continuation of data distribution according to an embodiment of the present invention.
Figure 21:
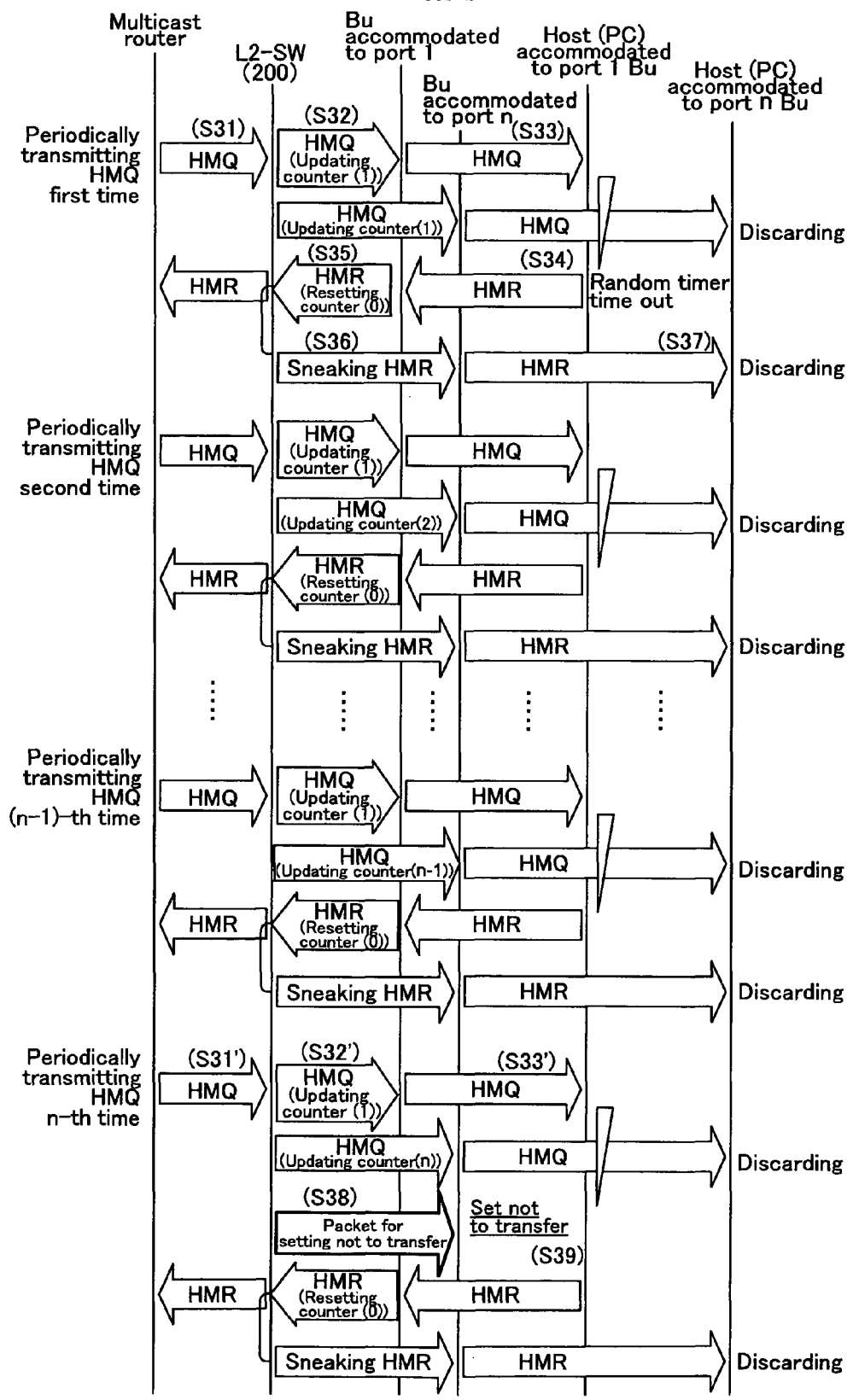
FIG. 21 is a third sequence diagram for explaining operation to avoid the erroneous continuation of data distribution according to an embodiment of the present invention.

Referring to FIGS. 8, 12, and 21, described below is a method of avoiding the case in which data distribution to subscriber-side terminal apparatus BU accommodating a host apparatus that desires to terminate data distribution is erroneously continued or the case in which a request to terminate the data distribution is erroneously left not transmitted according to an embodiment of the present invention. In response to receipt of a HMQ from a upper rank router (step S31), the station-side terminal apparatus (L2-SW) 200 updates the count of a counter provided for each subscriber-side terminal apparatus BU (BU that has already returned a HMR) to which multicast data is being distributed (step S32).

In response to receipt of the HMQ, each subscriber-side terminal apparatus BU transfers the HMQ to the host apparatuses accommodated thereto (step S33). In response to receipt of the transferred HMQ, if the host apparatus desires to continuously receive data distribution indicated in the transferred HMQ, transmits a HMR after a random time period measured by its random timer. In response to receipt of the HMR from the host apparatus, the subscriber-side terminal apparatus BU transfers the HMR to the upper rank station-side terminal apparatus 200 (step S34). In response to receipt of the HMR, the station-side terminal apparatus 200 operates in connection with the port through which the HMR is received in the same manner as described above with reference to FIGS. 5 and 9, and resets the counter corresponding to the subscriber-side terminal apparatus BU that has transmitted the HMR (step S35).

The station-side terminal apparatus 200 does nothing for the other ports through which the HMR has not received. However, the other ports may include a particular port accommodating a host apparatus that desires to receive data distribution but has not transmitted a HMR because the host apparatus has received a sneaking HMR from the representative port as described above. To solve this problem, since a host apparatus may fail to transmit a HMR due to the sneaking HMR from the representative port (steps S36, S37), data distribution to the port may not be terminated soon.

The multicast router periodically transmits a HMR, and each transmission of the HMR updates the counter of each subscriber-side terminal apparatus BU (step S31'). In response to receipt of the HMR, each subscriber-side terminal apparatus BU does not transmit a HMR even after a random time period measured by its random timer as described above if the subscriber-side terminal apparatus BU desires to terminate the receiving of data distribution. The counter provided to the station-side terminal apparatus 200 corresponding to the subscriber-side terminal apparatus BU is not reset to zero. As a result, the counter counts out. The station-side terminal apparatus 200 transmits a packet to the subscriber-side terminal apparatus BU accommodated thereto, the packet requesting the subscriber-side terminal apparatus to prohibit multicast packets having the multicast address described above to the host apparatuses accommodated thereto from being transferred and to discard the multicast packets (transfer termination request).

In response to receipt of the packet, the subscriber-side terminal apparatus BU sets itself not to transfer but discard multicast packets having the multicast address to the host apparatuses accommodated thereto. As a result, the subscriber-side terminal apparatus BU discards the data distribution and does not transfer the data distribution to the host apparatuses accommodated thereto. The host apparatus is allowed not to receive the data distribution that the host apparatus does not desire to receive.

To realize such an operation, the count of the counter of each subscriber-side terminal apparatus BU at which the counter counts out needs to be adjusted taking it into consideration that there is a port to which a host apparatus is accommodated, the host apparatus being unable to transmit a HMR due to a sneaking HMR from another port, as described above. Furthermore, if the count of the counter at which the counter counts out is set too high, timing at which the transfer termination request is transmitted to the subscriber-side terminal apparatus BU accommodating a host apparatus that does not desire to receive the data distribution and timing at which the data distribution to a port accommodating the subscriber-side terminal apparatus is terminated may be delayed, which results in that the host apparatus is forced to receive the data distribution for a unnecessarily long time period. The count at which the counter counts out needs to be determined appropriately taking such matters into consideration.

As described above, a method of controlling the distribution of multicast packets for an Ether PON system according to an embodiment of the present invention allows multicast packets to be distributed to the host apparatuses that desire to receive data distribution. According to the above arrangements, the other host apparatuses that do not desire to be served the data distribution are discharged from unnecessary load, and it is avoided that the data distribution is provided for free to the other host apparatuses to which the data distribution is not to be served.

FIGS. 13A and 13B show a data diagram of an exemplary packet format of the above HMQ. FIG. 13A shows the packet format of the HMQ, and FIG. 13B shows the contents of each item of the packet format. The multicast address described above is set in "Group Address" (1) in the packet format. An inquiry is made of whether data distribution identified by this multicast address is required or not.

Figure 14A:
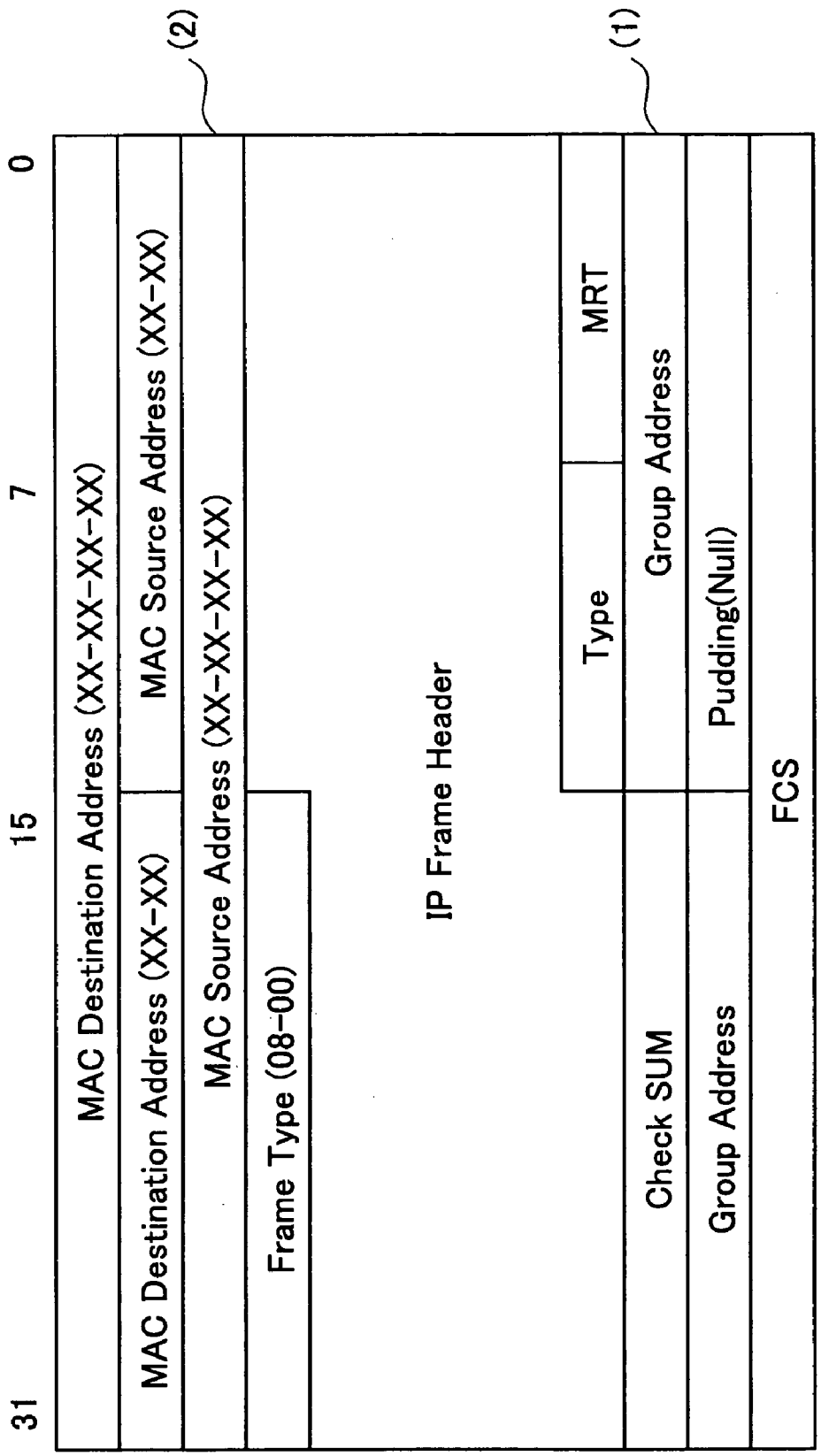

FIGS. 14A and 14B shows an exemplary packet format of the HMR described above. FIG. 14A shows the packet format for the HMR, and FIG. 14B shows the contents of each item of the packet format. If a host apparatus desires data distribution identified by a multicast address set in "Group Address" (1) in the packet format, the host apparatus sets its own MAC address in "MAC Source Address" (2), and transmits the packet back to the multicast router via the upper rank subscriber-side terminal apparatus and the station-side terminal apparatus. Upon the transmission, the subscriber-side terminal apparatus acquires the MAC address of the host apparatus as described above. When the subscriber-side terminal apparatus finds the MAC address is set in a search frame transmitted by the station-side terminal apparatus, the subscriber-side terminal apparatus sets its own identification information in the search frame, and returns the search frame.

Figure 15A:
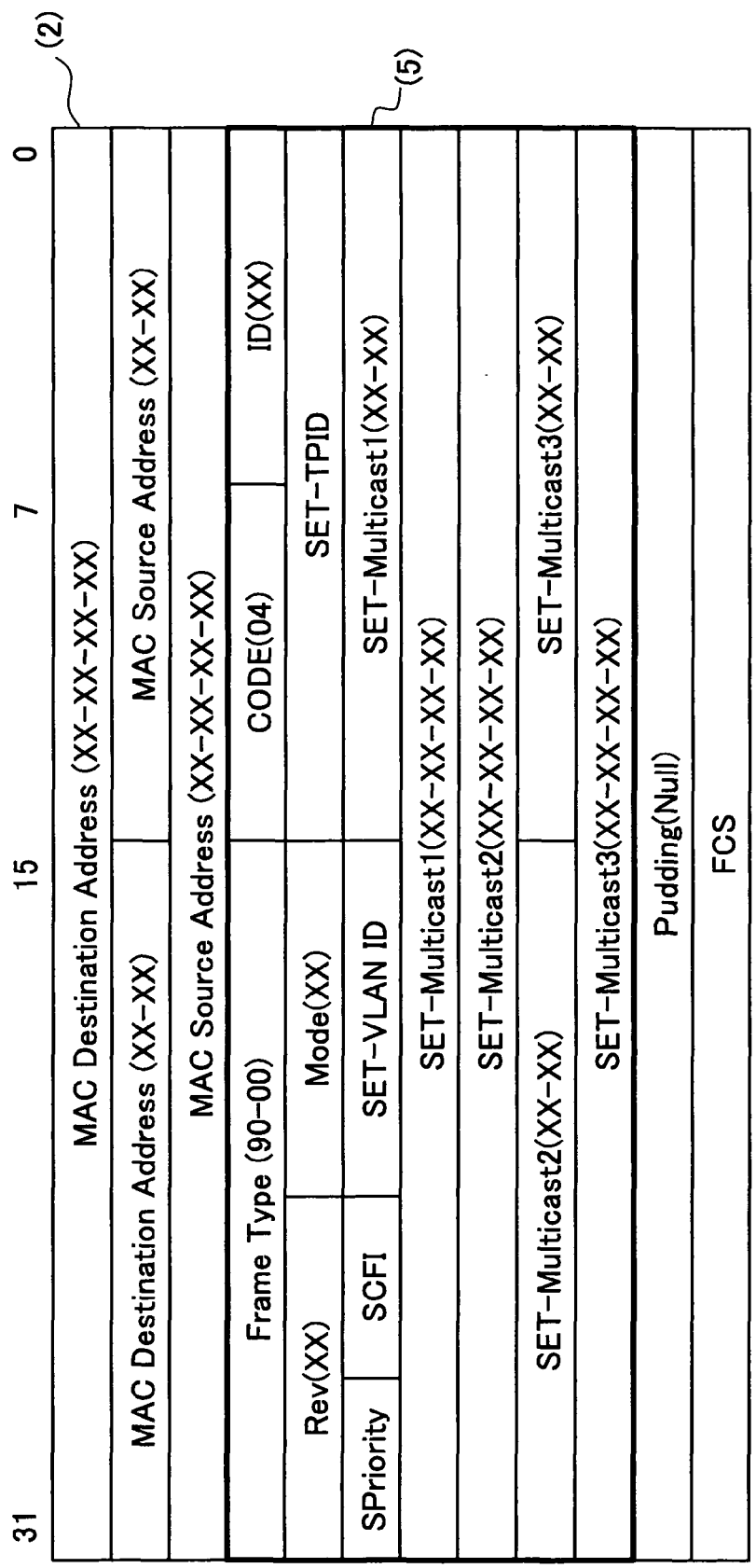

FIGS. 15A and 15B show an exemplary packet format of the above search frame. FIG. 15A shows the packet format of the search frame, and FIG. 15B shows the contents of each item of the format. The MAC address of a host apparatus that has transmitted the HMR is set in "MAC Destination Address" (2) in the packet format. The station-side terminal apparatus transmits the search packet to each subscriber-side terminal apparatus in order to search the subscriber-side terminal apparatus that has transmitted a HMR or a Leave packet.

FIGS. 16A and 16B show an exemplary packet format of a response frame corresponding to the above search frame. FIG. 16A shows the packet format of the response frame corresponding to the search frame, and FIG. 16B shows the contents of each item of the format. When receiving the above search frame, the subscriber-side terminal apparatus compares a MAC address set in "MAC Destination Address" (2) with a MAC address that the subscriber-side terminal apparatus has already acquired. If both MAC addresses match, the subscriber-side terminal apparatus acquires the search frame and returns the frame to the station-side terminal apparatus after setting its own identification information in "MAC Source Address" (4) in the packet format.

FIGS. 17A and 17B show an exemplary packet format of a transfer request packet or a transfer termination request packet that the station-side terminal apparatus transmits to the subscriber-side terminal apparatus in response to receipt of the response frame described above. FIG. 17A shows the packet format of the transfer request frame, and FIG. 17B shows the contents of each item of the format. The station-side terminal apparatus designates the address of data distribution corresponding to the multicast address in "SET-Multicast" (5) in the packet format, and requests the subscriber-side terminal apparatus to transfer or not to transfer the multicast packets having the multicast address to the host apparatuses accommodated thereto.

Figure 18A:
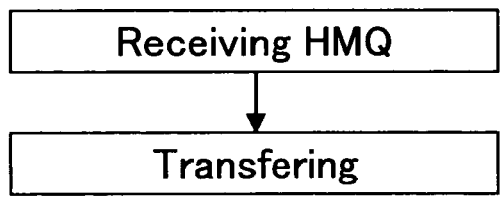
Figure 18B:
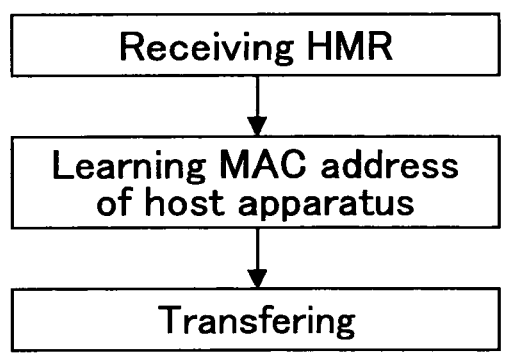
Figure 18C:
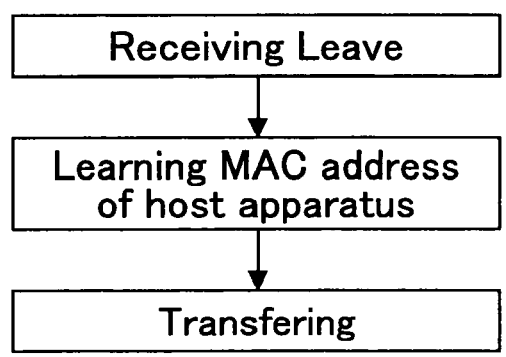

FIGS. 18A through 18E are flowcharts showing the operation of a subscriber-side terminal apparatus. FIG. 18A shows the operation in response to receipt of a HMQ from the station-side terminal apparatus 200. The subscriber-side terminal apparatus transfers the received HMQ to the host apparatuses accommodated thereto. FIG. 18B shows the operation in response to receipt of a HMR from a host apparatus accommodated thereto. The subscriber-side terminal apparatus acquires the MAC address of the host apparatus set in the HMR, and transmits the HMR to a upper rank apparatus. FIG. 18C shows the operation in response to receipt of a Leave packet from a host apparatus accommodated thereto. The subscriber-side terminal apparatus acquires the MAC address of the host apparatus set in the Leave packet, and transmits the Leave packet to the upper rank apparatus.

FIG. 18D shows the operation in response to receipt of a search frame from a upper rank apparatus. If the MAC address of a host apparatus that has already been acquired is set in the search frame, the subscriber-side terminal apparatus sets its own identification apparatus in the search frame, and transmits the search frame to the upper rank apparatus. Otherwise, the subscriber-side terminal apparatus discards the search frame. FIG. 18E shows the operation in response to receipt of a packet requesting the transfer of data distribution is required or not. If the packet requests for the transfer of multicast packets having a designated multicast address (designated multicast address transfer), the subscriber-side terminal apparatus is set such that the subscriber-side terminal apparatus transfers the multicast packets. If the packet requests for prohibiting the multicast packets having a designated multicast address from being transferred (designated multicast address non-transfer), the subscriber-side terminal apparatus is set such that the subscriber-side terminal apparatus does not transfer the multicast packets.

Figure 19A:
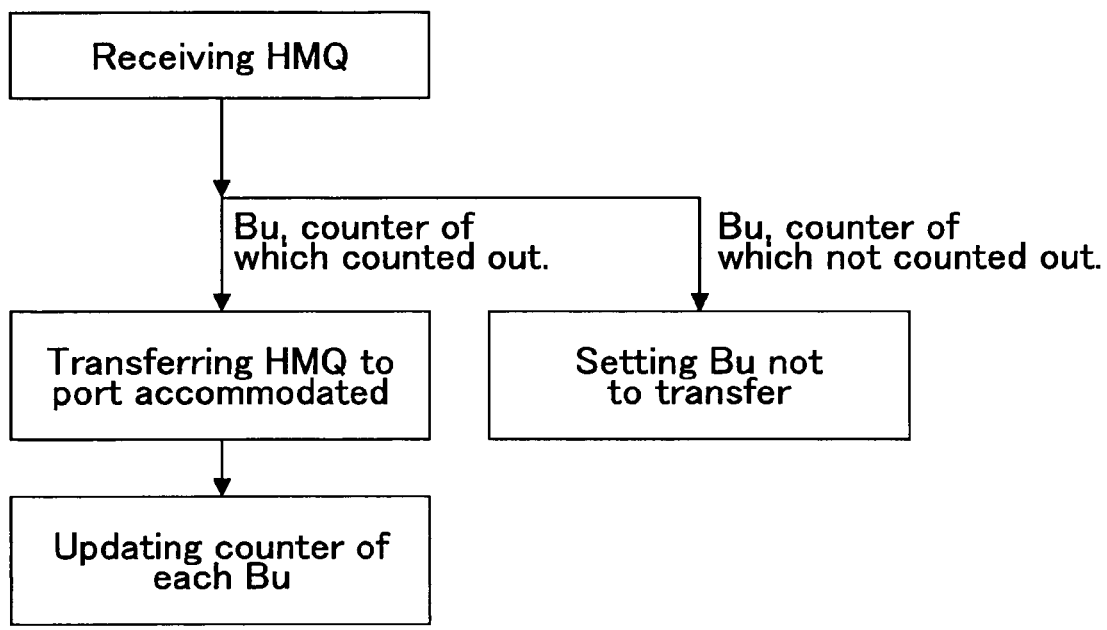
FIGS. 19A through 19D are flowcharts showing operation of a station-side terminal apparatus.
Figure 19B:
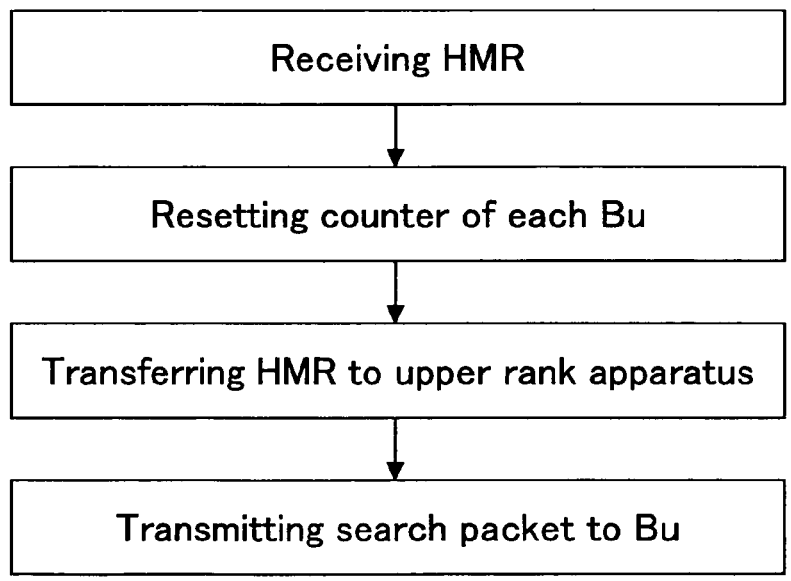
Figure 19C:
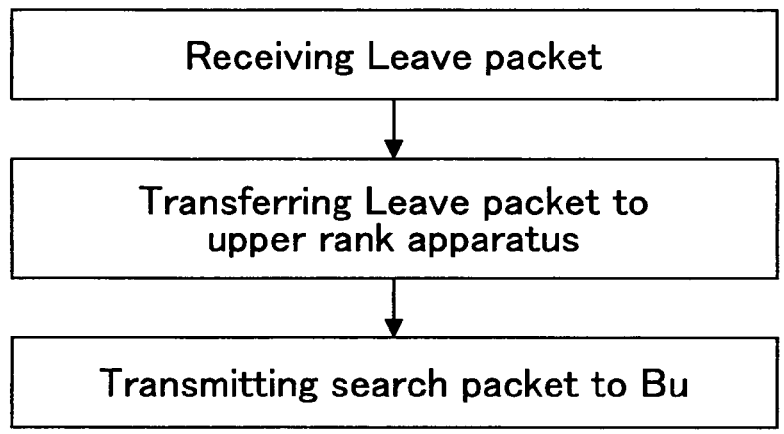
Figure 19D:
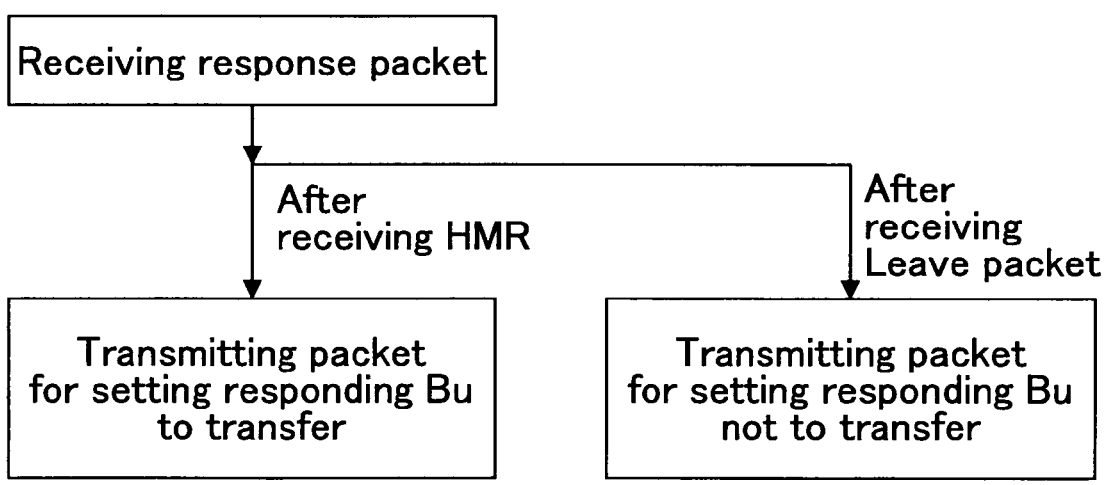

FIGS. 19A through 19D show the operation of the station-side terminal apparatus 200. Referring to FIG. 19A, in response to receipt of a HMQ from the upper rank multicast router, the station-side terminal apparatus transfers the HMQ to the subscriber-side terminal apparatuses, the counter corresponding to which has not counted out through the port. On the other hand, the station-side terminal apparatus transmits a no-transfer request packet requesting the subscriber-side terminal apparatus not to transfer multicast packets having the designated multicast address. Referring to FIG. 19B, in response to receipt of a HMR from a subscriber-side terminal apparatus accommodated thereto, the station-side terminal apparatus resets to zero the counter corresponding to the subscriber-side terminal apparatus, and transfers the HMR to the upper rank apparatus. The station-side terminal apparatus further transmits the search frame described above to the lower rank apparatus. Referring to FIG. 19C, in response to receipt of a Leave packet from the lower rank apparatus, the station-side terminal apparatus transfers the Leave packet, and transmits the search frame to the lower rank apparatus as described above. Referring to FIG. 19D, in response to receipt of a response frame responding to the search frame, if the response frame is regarding a HMR, the station-side terminal apparatus transmits a transfer request packet to the subscriber-side terminal apparatus that has responded to the search frame, the transfer request packet requesting the subscriber-side terminal apparatus to transfer multicast packets having the designated multicast address to the host apparatuses accommodated thereto. On the other hand, if the response frame is regarding a Leave packet, the station-side terminal apparatus transmits a non-transfer request packet to the subscriber-side terminal apparatus that has responded to the search frame, the non-transfer request packet requesting the subscriber-side terminal apparatus not to transfer multicast packets having the designated multicast address to the host apparatuses accommodated thereto.

In addition, an Ether PON system according to the present invention can be characterized as follows.

According to a first aspect of the present invention, an Ether PON system including a station-side optical terminal apparatus and multiple subscriber-side optical terminal apparatuses accommodated to the ports of the station-side optical terminal apparatus via optical couplers, is characterized in that the subscriber-side optical terminal apparatus can transfer multicast packets having a multicast address designated by the station-side optical terminal apparatus to host apparatuses accommodated to the subscriber-side optical terminal apparatus in accordance with a request from the station-side optical terminal apparatus.

According to a second aspect of the present invention, an Ether PON system including a station-side optical terminal apparatus and multiple subscriber-side optical terminal apparatuses accommodated to the ports of the station-side optical terminal apparatus via optical couplers, is characterized in that the subscriber-side optical terminal apparatus can prohibit multicast packets having a multicast address designated by the station-side optical terminal apparatus from being transmitted to host apparatuses accommodated to the subscriber-side optical terminal apparatus in accordance with a request from the station-side optical terminal apparatus.

According to a third aspect of the present invention, an Ether PON system including a station-side optical terminal apparatus and multiple subscriber-side optical terminal apparatuses accommodated to the ports of the station-side optical terminal apparatus via optical couplers, is characterized in that the subscriber-side optical terminal apparatus can store information indicating that the subscriber-side optical terminal apparatus has received a packet requesting for data distribution from a host apparatus accommodated to the subscriber-side terminal apparatus, and notify the station-side optical terminal apparatus of the stored information in response to receipt of the request from the station-side optical terminal apparatus.

According to a fourth aspect of the present invention, an Ether PON system including a station-side optical terminal apparatus and multiple subscriber-side optical terminal apparatuses accommodated to the ports of the station-side optical terminal apparatus via optical couplers, is characterized in that the subscriber-side optical terminal apparatus can store information indicating that the subscriber-side optical terminal apparatus has received a packet requesting for the termination of data distribution from a host apparatus accommodated to the subscriber-side terminal apparatus, and notify the station-side optical terminal apparatus of the stored information in response to receipt of the request from the station-side optical terminal apparatus.

According to a fifth aspect of the present invention, an Ether PON system including a station-side optical terminal apparatus and multiple subscriber-side optical terminal apparatuses accommodated to the ports of the station-side optical terminal apparatus via optical couplers, is characterized in that, when the station-side optical terminal apparatus receives a packet requesting for data distribution through its port, the station-side optical terminal apparatus inquires which subscriber-side optical terminal apparatus accommodated to the port has transferred the received packet, and complements the stored information according to the third aspect of the information.

According to a sixth aspect of the present invention, an Ether PON system including a station-side optical terminal apparatus and multiple subscriber-side optical terminal apparatuses accommodated to the ports of the station-side optical terminal apparatus via optical couplers, is characterized in that, when the station-side optical terminal apparatus receives a packet requesting for the termination of data distribution through its port, the station-side optical terminal apparatus inquires which subscriber-side optical terminal apparatus accommodated to the port has transferred the received packet, and complements the stored information according to the fourth aspect of the information.

According to a seventh aspect of the present invention, an Ether PON system including a station-side optical terminal apparatus and multiple subscriber-side optical terminal apparatuses accommodated to the ports of the station-side optical terminal apparatus via optical couplers, is characterized in that the station-side optical terminal apparatus and the subscriber-side optical terminal apparatus can generate, transmit, and receive a special frame exchanged between the station-side optical terminal apparatus and the subscriber-side optical terminal apparatus in order to realize the operation of the station-side optical terminal apparatus and the subscriber-side optical terminal apparatus such as inquiry and request described above.

According to a eighth aspect of the present invention, an Ether PON system including a station-side optical terminal apparatus and multiple subscriber-side optical terminal apparatuses accommodated to the ports of the station-side optical terminal apparatus via optical couplers is characterized in that the station-side optical terminal apparatus sets the subscriber-side optical terminal apparatus accommodating a host apparatus that has requested for data distribution based on the stored information according to the third aspect, such that the subscriber-side optical terminal apparatus transmits multicast packets having a designated multicast address only to the host apparatus, in order to prohibit multicast packets from being distributed to the other host apparatuses that has not requested for data distribution.

According to a ninth aspect of the present invention, an Ether PON system including a station-side optical terminal apparatus and multiple subscriber-side optical terminal apparatuses accommodated to the ports of the station-side optical terminal apparatus via optical couplers is characterized in that the station-side optical terminal apparatus sets the subscriber-side optical terminal apparatus accommodating a host apparatus that has requested for the termination of data distribution based on the stored information according to the fourth aspect, such that the subscriber-side optical terminal apparatus only prohibits multicast packets having a designated multicast address from being transmitted to the host apparatus, in order to continuously transmit multicast packets to the other host apparatuses that has not requested for the termination of data distribution.

According to a tenth aspect of the present invention, the Ether PON system according to the eighth and ninth aspects of the present invention is further characterized in that the station-side optical terminal apparatus can designate multiple multicast addresses and set the subscriber-side optical terminal apparatus such that the subscriber-side optical terminal apparatus transmit multicast packets having one of the designated multicast addresses or prohibit the multicast packets from being transmitted to the host apparatus.

According to an eleventh aspect of the present invention, an Ether PON system including a station-side optical terminal apparatus and multiple subscriber-side optical terminal apparatuses accommodated to the ports of the station-side optical terminal apparatus via optical couplers is characterized in that, if all host apparatuses accommodated to all subscriber-side optical terminal apparatus accommodated to a particular port of the station-side optical terminal apparatus transmits a packet requesting for the termination of data distribution, the station-side optical terminal apparatus prohibits multicast packets from being transmitted to the particular port in order to reduce load of the station side.

According to a twelfth aspect of the present invention, an Ether PON system including a station-side optical terminal apparatus and multiple subscriber-side optical terminal apparatuses accommodated to the ports of the station-side optical terminal apparatus via optical couplers is characterized in that, if all host apparatuses accommodated to all subscriber-side optical terminal apparatus accommodated to all ports of the station-side optical terminal apparatus transmits a packet requesting for the termination of data distribution, the station-side optical terminal apparatus transmits a packet requesting a multicast router to terminate data distribution in order to reduce load of the station-side optical terminal apparatus.

According to a thirteenth aspect of the present invention, an Ether PON system including a station-side optical terminal apparatus and multiple subscriber-side optical terminal apparatuses accommodated to the ports of the station-side optical terminal apparatus via optical couplers is characterized in that the subscriber-side optical terminal apparatus waits for a predetermined times before prohibiting multicast packets having a multicast address designated by the station-side optical terminal apparatus from being transmitted to host apparatuses accommodated to the subscriber-side optical terminal apparatus in order to avoid the erroneous termination of data distribution to a host apparatus that desires to continuously receive the data distribution.

According to a fourteenth aspect of the present invention, an Ether PON system including a station-side optical terminal apparatus and multiple subscriber-side optical terminal apparatuses accommodated to the ports of the station-side optical terminal apparatus via optical couplers is characterized in that the Ether PON system can store and display the information according to the third and fourth aspects of the present invention such that the transfer of multicast packets by the subscriber-side terminal apparatus can be displayed through the man-machine interface of the Ether PON system.

A communication system according to an aspect of the present invention may include a station-side terminal apparatus and multiple subscriber-side terminal apparatuses connected thereto via transmission couplers. Each subscriber-side terminal apparatus, in response to receipt of a packet (request packet) indicating whether data distribution is required from a host apparatus connected to the subscriber-side terminal apparatus, acquires host apparatus identification information contained in the request packet, and transfers the request packet to the station-side terminal apparatus. The station-side terminal apparatus, in response to receipt of the request packet, transfers the request packet to a transmission channel connection apparatus to which the station-side terminal apparatus is accommodated, and transmits a packet (inquiry packet), to which the host apparatus identification information is attached, inquiring whether the request packet is transmitted. Each subscriber-side terminal apparatus, if the subscriber-side terminal apparatus has acquired the host apparatus identification information, can return the inquiry packet after attaching its own identification information thereto. The station-side terminal apparatus can transmit a packet (designation packet) designating a address to which the transfer of data distribution is required or not in accordance with whether data distribution is required or not, to the subscriber-side terminal apparatus, based on the identification information of the subscriber-side terminal apparatus contained in the returned inquiry packet. The subscriber-side terminal apparatus, in response to receipt of the designation packet, retains the address to which the transfer of data distribution is required or not, and transmits multicast packets addressed to the address to which the transfer of data distribution is required to the host apparatus the identification information of which has been acquired, or prohibits multicast packets addressed to the address to which the transfer of data distribution is not required from being transmitted to the host apparatus.

A communication system according to another aspect of the present invention may include a station-side terminal apparatus and multiple subscriber-side terminal apparatuses connected thereto via transmission couplers. The station-side terminal apparatus includes a counter for each subscriber-side terminal apparatus. The station-side terminal apparatus periodically transmits a packet inquiring whether data distribution is required, and increments the counter every time the station-side terminal apparatus transmits the packet. The station-side terminal apparatus, in response to receipt of a packet requesting data distribution from a subscriber-side terminal apparatus, resets the counter corresponding to the subscriber-side terminal apparatus to zero. The station-side terminal apparatus can transfer the returned packet requesting for data distribution, to other subscriber-side terminal apparatuses. Each subscriber-side terminal apparatus, in response to receipt of the packet inquiring whether data distribution is required from the station-side terminal apparatus, can transfer the packet to host apparatuses connected thereto and, if a packet requesting for data distribution from a host apparatus, transfer the packet to the station-side terminal apparatus. The station-side terminal apparatus keeps distributing distribution data to the subscriber-side terminal apparatus until the counter corresponding to the subscriber-side terminal apparatus counts out, whereas the station-side terminal apparatus can terminate data distribution to a subscriber-side terminal apparatus, the counter corresponding to which has been counted out. The termination of data distribution may be realized by actually terminating the data distribution to the port or by requesting the subscriber-side terminal apparatus not to transfer but to discard distribution data.

A communication apparatus according to an aspect of the present invention may have station-side terminal function and be connected to multiple subscriber-side terminal apparatuses via transmission couplers. The communication apparatus, in response to receipt of a packet indicating whether data distribution is required or not from a subscriber-side terminal apparatus, transmits a packet inquiring whether a packet indicating whether data distribution is required or not is transmitted with host apparatus identification information of the packet. The communication apparatus transmits a packet designating an address to which the transfer of distribution data is required or not to the subscriber-side terminal apparatus based on the identification information of the subscriber-side terminal apparatus contained in the response to the inquiring packet. Each subscriber-side terminal apparatus, in response to receipt of the packet designating an address to which the transfer of distribution data is required or not, can retain the address, and transfer or not packet addressed to the retained address to the host apparatus that has transmitted a packet requesting data distribution.

A communication apparatus according to another aspect of the present invention may have subscriber-side terminal function and be connected to a station-side terminal apparatus via transmission couplers. The communication apparatus, in response to receipt of a packet indicating whether data distribution is required or not, can transfer the packet to the station-side terminal apparatus, and acquire host apparatus identification information contained in the packet. The communication apparatus, in response to receipt of an inquiry packet inquiring whether the packet indicating whether data distribution is required or not is transmitted from the station-side terminal apparatus, host identification information being attached to the inquiry packet, compares the attached identification information with identification information that has already acquired and, if both identification information match, returns a packet with identification information of the communication apparatus attached thereto. In the case in which the station-side terminal apparatus transmits a packet designating an address to which whether data distribution is require or not is designated to the communication apparatus, the communication apparatus transmits or does not transmit received packets addressed to the designated address to the host apparatus that has transmitted a packet indicating whether data distribution is required or not based on the indication of the packet.

A communication apparatus according to yet another aspect of the present invention may have station-side terminal function and be connected to multiple subscriber-side terminal apparatuses via transmission couplers. The communication apparatus includes a counter for each subscriber-side terminal apparatus. The communication apparatus periodically transmits a packet inquiring whether data distribution is required, and increments the counter every time the communication apparatus transmits the packet. The communication apparatus, in response to receipt of a packet requesting data distribution from a subscriber-side terminal apparatus, resets the counter corresponding to the subscriber-side terminal apparatus to zero. The communication apparatus can transfer the returned packet requesting for data distribution, to other subscriber-side terminal apparatuses. Each subscriber-side terminal apparatus, in response to receipt of the packet inquiring whether data distribution is required from the communication apparatus, can transfer the packet to host apparatuses connected thereto and, if a packet requesting for data distribution from a host apparatus, transfer the packet to the communication apparatus. The communication apparatus keeps distributing distribution data to the subscriber-side terminal apparatus until the counter corresponding to the subscriber-side terminal apparatus counts out, whereas the communication apparatus can terminate data distribution to a subscriber-side terminal apparatus, the counter corresponding to which has been counted out.

The preferred embodiments of the present invention are described above in connection with the management of a network system. The present invention is not limited to these embodiments, but various variations and modifications may be made without departing from the scope of the present invention.

This patent application is based on PCT patent application No. JP2003/004116 filed on Mar. 31, 2003, the entire contents of which are hereby incorporated by reference.

What is claimed is:

1. A communication system, comprising:
a station-side terminal apparatus; and
a plurality of subscriber-side terminal apparatuses electrically coupled to said station-side terminal apparatus, wherein:
said station-side terminal apparatus comprises a counter for each subscriber-side terminal apparatus, and determines whether each subscriber-side terminal apparatus has issued a packet to request data distribution or termination of data distribution based on a count of the counter for each subscriber-side terminal apparatus; and
each subscriber-side terminal apparatus transmits a packet indicating whether data distribution is or is not required, if and only if the subscriber-side terminal apparatus does not receive another packet transmitted by another subscriber-side terminal apparatus during a predetermined wait time period, the another packet indicating whether data distribution is or is not required.

2. A method of communicating in a communication system, comprising:
the communication system including:
a station-side terminal apparatus; and
a plurality of subscriber-side terminal apparatuses electrically coupled to the station-side terminal apparatus, and
the method including:
determining, by the station-side terminal apparatus, whether each subscriber-side terminal apparatus has issued a packet to request data distribution or termination of data distribution based on a count of a counter for each subscriber-side terminal apparatus; and
transmitting, by each subscriber-side terminal apparatus, a packet indicating whether data distribution is or is not required, if and only if the subscriber-side terminal apparatus does not receive another packet transmitted by another subscriber-side terminal apparatus during a predetermined wait time period, the another packet indicating whether data distribution is or is not required.

* * * * *